US012625074B2

(12) United States Patent
Niikura

(10) Patent No.: US 12,625,074 B2
(45) Date of Patent: May 12, 2026

(54) TIME MEASUREMENT DEVICE, FLUORESCENCE LIFETIME MEASUREMENT DEVICE, AND TIME MEASUREMENT METHOD

(71) Applicant: HAMAMATSU PHOTONICS K.K., Hamamatsu (JP)

(72) Inventor: Fuminori Niikura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 631 days.

(21) Appl. No.: 18/017,694

(22) PCT Filed: May 13, 2021

(86) PCT No.: PCT/JP2021/018264
§ 371 (c)(1),
(2) Date: Jan. 24, 2023

(87) PCT Pub. No.: WO2022/030063
PCT Pub. Date: Feb. 10, 2022

(65) Prior Publication Data
US 2023/0288335 A1 Sep. 14, 2023

(30) Foreign Application Priority Data
Aug. 6, 2020 (JP) ................................. 2020-133842

(51) Int. Cl.
*G01N 21/64* (2006.01)
*G01J 3/28* (2006.01)
(Continued)

(52) U.S. Cl.
CPC ........ *G01N 21/6408* (2013.01); *G01J 3/2823* (2013.01); *G01J 3/4406* (2013.01);
(Continued)

(58) Field of Classification Search
None
See application file for complete search history.

(56) References Cited

U.S. PATENT DOCUMENTS 7,893,409 B1 2/2011 Cousins
8,330,123 B2 * 12/2012 Gratton .............. G01N 21/6408
250/459.1
(Continued)

FOREIGN PATENT DOCUMENTS

CN 101944838 A 1/2011
CN 103105383 A 5/2013
(Continued)

OTHER PUBLICATIONS

International Preliminary Report on Patentability mailed Feb. 16, 2023 for PCT/JP2021/018264.
(Continued)

*Primary Examiner* — Neil N Turk
(74) *Attorney, Agent, or Firm* — Faegre Drinker Biddle & Reath LLP

(57) ABSTRACT
A time measurement apparatus 10 includes a TAC circuit 12, a measurement gate 11, a control unit 14 for setting a gate dead time, which is a time during which the measurement gate 11 is set to be in the second state, in the measurement gate 11, and the control unit 14 for deriving and outputting time information related to the detection signal based on a measurement signal output from the TAC circuit 12, and the control unit 14 functioning as a setting unit sets a time, which is an integral multiple of a repetition period of fluorescence detected by the detector 4 and is longer than a dead time of the TAC circuit 12 itself, in the measurement gate 11 as a gate dead time.

8 Claims, 22 Drawing Sheets

(51) Int. Cl.
  *G01J 3/44* (2006.01)
  *G04F 10/00* (2006.01)
  *G01N 21/47* (2006.01)

(52) U.S. Cl.
  CPC ....... *G01N 21/6428* (2013.01); *G04F 10/005* (2013.01); *G01N 2021/4797* (2013.01)

(56) References Cited

U.S. PATENT DOCUMENTS

| | | | |
|---|---|---|---|
| 8,786,474 B1 | 7/2014 | Mann | |
| 2005/0072936 A1* | 4/2005 | Kotani | .................. G01J 3/4406 |
| | | | 250/458.1 |

FOREIGN PATENT DOCUMENTS

| | | |
|---|---|---|
| CN | 105262504 A | 1/2016 |
| CN | 105529951 A | 4/2016 |
| CN | 108489947 A | 9/2018 |
| CN | 109477796 A | 3/2019 |
| DE | 102008004549 A1 | 7/2009 |
| JP | H2-234051 A | 9/1990 |
| JP | H07-049308 A | 2/1995 |
| JP | 2000-295090 A | 10/2000 |
| JP | 2011-027621 A | 2/2011 |
| JP | 2011-235465 A | 11/2011 |
| JP | 2016-053516 A | 4/2016 |
| JP | 2019-518952 A | 7/2019 |
| SU | 1468251 A1 | 4/1992 |
| TW | 201610622 A | 3/2016 |
| WO | WO-2017/202980 A1 | 11/2017 |

OTHER PUBLICATIONS

Cominelli, A., et al., "High-speed and low-distortion solution for time-correlated single photon counting measurements: A theoretical analysis," Review of Scientific Instruments 88, 2017, p. 123701-1-p. 123701-10.

Shi Guangyong et al., "Elimination of Residual Current Action Protector Protection "Dead Zone" Research", China Electric Power Education, S2, Dec. 20, 2010.

Piotr Dudek et al, "High-Resolution CMOS Time-to-Digital Converter Utilizing a Vernier Delay Line", IEEE Transactions on Solid-State Circuits, Feb. 29, 2000, p. 240-p. 247.

Michael Wahl, "The Principle of Time-Correlated Single Photon Counting", https://www.picoquant.com/images/uploads/page/files/7253/technote_tcspc.pdf, 2014, p. 1-p. 14, XP093170067.

Giulia Acconcia, "Fast and compact time-correlated single photon counting system for high-speed measurement with low distortion", International Society for Optical Engineering, Bellingham, WA, US, 2020, p. 1124608, XP060128528.

* cited by examiner

MEASURED REGION

TIME MEASUREMENT DEVICE, FLUORESCENCE LIFETIME MEASUREMENT DEVICE, AND TIME MEASUREMENT METHOD

TECHNICAL FIELD

One aspect of the present invention relates to a time measurement apparatus, a fluorescence lifetime measurement apparatus, and a time measurement method.

BACKGROUND ART

A time correlated single photon counting (TCSPC) apparatus that performs fluorescence lifetime measurement and the like is known (see, for example, Patent Literature 1). The TCSPC apparatus described in Patent Literature 1 includes a plurality of time-digital-converter (TDC) circuits. The TDC circuit outputs a time measurement result as a digital signal.

CITATION LIST

Patent Literature

[Patent Literature 1] German Patent Application No. 102008004549

SUMMARY OF INVENTION

Technical Problem

In the TDC circuit described above and a TAC circuit that outputs a time measurement result as an analog signal, after a time is measured, a dead time in which a time cannot be measured again for a certain period of time is set. Due to the generation of the dead time, in a case where a phenomenon such as fluorescence is detected and time measurement related to the phenomenon (for example, fluorescence lifetime measurement) is performed, there is a concern that a time waveform for the phenomenon cannot be appropriately acquired. That is, since a time waveform cannot be acquired during a dead time, an accurate time waveform for the phenomenon may not be acquired even when time waveforms that could be obtained are synthesized.

One aspect of the present invention has been made in view of the above circumstances, and relates to a time measurement apparatus, a fluorescence lifetime measurement apparatus, and a time measurement method which are capable of appropriately acquiring a time waveform related to a phenomenon.

Solution to Problem

A time measurement apparatus according to an aspect of the present invention includes a first time measurement instrument configured to receive an input of a detection signal, which is a phenomenon detected and output by a detector, and output a measurement signal corresponding to a time associated with the detection signal, a gate unit configured to be provided between the detector and the first time measurement instrument and set to be in a first state where the detection signal is transmitted in a direction of the first time measurement instrument, or a second state where the detection signal is not transmitted in a direction of the first time measurement instrument, a setting unit configured to set a gate dead time during which the gate unit is set to be in the second state in the gate unit, and a derivation unit configured to derive and output time information related to the detection signal based on the measurement signal output from the first time measurement instrument, in which the setting unit sets a time, which is an integral multiple of a repetition period of the phenomenon detected by the detector and is longer than a dead time of the first time measurement instrument itself, in the gate unit as the gate dead time.

In the time measurement apparatus according to an aspect of the present invention, switching is made between a first state where a detection signal is input to the first time measurement instrument that outputs a measurement signal corresponding to a time associated with the detection signal and a second state where the detection signal is not input. A gate dead time that is an integral multiple of a repetition period of the phenomenon and is longer than a dead time of the first time measurement instrument itself is set in the gate unit, and the first time measurement instrument is set to be in the second state described above during the gate dead time. In such a time measurement apparatus, a gate dead time that is an integral multiple of the repetition period of the phenomenon is set in the gate unit, and thus a time waveform in time information derived based on the measurement signal output from the first time measurement instrument is equivalent to a waveform that is temporally continuous before and after the dead time (non-measurement state). Further, in the time measurement apparatus, since the gate dead time set in the gate unit is longer than the dead time of the first time measurement instrument itself, the dead time of the first time measurement instrument does not occur in spite of a measurement state where a detection signal is input to the first time measurement instrument, and thus it is possible to appropriately secure continuity of a time waveform before and after the gate dead time described above. As described above, according to the time measurement apparatus of the aspect of the present invention, it is possible to appropriately (continuously) acquire a time waveform related to a phenomenon.

The time measurement apparatus may further include a delay generation circuit, in which the setting unit may set a delay amount that is an integral multiple of the repetition period in the delay generation circuit, the delay generation circuit may receive an input of the detection signal that has passed through the gate unit set to be in the first state, and may output a delay signal delayed by the delay amount set by the setting unit with respect to the detection signal to the gate unit, and the gate unit may be set to be in the first state to transmit the detection signal, may be set to be in the second state until receiving an input of the delay signal, and may receive the input of the delay signal, and then may be set to be in the first state until a new detection signal is input. With such a configuration, it is possible to reliably set a gate dead time which is an integral multiple of a repetition period in the gate unit.

The first time measurement instrument may include a time-amplitude converter that outputs the measurement signal corresponding to a time associated with the detection signal as an analog signal, and a converter that converts the analog signal output from the time-amplitude converter into a digital signal and outputs the digital signal. By using the time-amplitude converter, which outputs a measurement signal as an analog signal, and the converter, it is possible to increase a time resolution in the measurement of a phenomenon as compared with a case where, for example, a time-digital converter is used.

The time measurement apparatus may further include a counter configured to output a count signal in accordance with a clock signal, in which the first time measurement instrument may receive inputs of the detection signal and the clock signal and output the measurement signal corresponding to a time between the detection signal and the clock signal, and the derivation unit may derive and output the time information based on the count signal output from the counter and the measurement signal output from the first time measurement instrument. With such a configuration, the counter operating in synchronization with a clock signal outputs a count signal so that rough time measurement (low time resolution and long time measurement) depending on the clock frequency is performed, and the first time-amplitude converter outputs a measurement signal corresponding to a time between a detection signal and the clock signal so that fine time measurement (high time resolution and short time measurement) for compensating for the measurement roughness of the counter is performed. Final time information is derived by combining these time measurement results, and thus it is possible to realize a high time resolution and long time measurement.

A fluorescence lifetime measurement apparatus according to an aspect of the present invention is a fluorescence lifetime measurement apparatus that measures a lifetime of fluorescence emitted from a measurement target, the fluorescence lifetime measurement apparatus including a light source configured to generate light, the detector configured to detect the fluorescence from the measurement target irradiated with the light from the light source and output the detection signal, the time measurement apparatus configured to output time information related to the detection signal, and an arithmetic operation unit configured to derive a fluorescence lifetime of the measurement target based on the time information. With such a fluorescence lifetime measurement apparatus, it is possible to appropriately (continuously) acquire a time waveform of fluorescence lifetime by using the above-described time measurement apparatus. In order to acquire a time waveform of fluorescence lifetime, complicated light amount adjustment and delay adjustment have been required in the related art. However, according to the fluorescence lifetime measurement apparatus of the present invention, it is possible to easily acquire a time waveform of a fluorescence waveform without performing such complicated adjustment.

The fluorescence lifetime measurement apparatus may further include a signal generation unit configured to generate a pulse signal for controlling output of light from the light source, in which the signal generation unit may output a setting signal indicating a repetition period of the fluorescence, which is synchronized with the pulse signal, to the setting unit. In this manner, the setting signal indicating the repetition period of the fluorescence, which is synchronized with the pulse signal, is output from the signal generation unit that generates the pulse signal, and thus the setting unit can appropriately set a gate dead time that is an integral multiple of a fluorescence repetition period in the gate unit.

The arithmetic operation unit may output a setting signal indicating a repetition period of the fluorescence to the setting unit. In this manner, the setting signal indicating the repetition period of the fluorescence is output from the arithmetic operation unit, and thus the setting unit can appropriately set a gate dead time that is an integral multiple of a fluorescence repetition period in the gate unit.

The fluorescence lifetime measurement apparatus may further include a signal generation unit configured to generate a pulse signal for controlling output of light from the light source, in which the signal generation unit may output a synchronization signal synchronized with the pulse signal, the time measurement apparatus may further include a second time measurement apparatus that outputs a signal corresponding to the synchronization signal, and the derivation unit may derive the time information based on the signal corresponding to the synchronization signal. Thereby, it is possible to derive the fluorescence lifetime with higher accuracy in consideration of the actual timing of fluorescence generation.

A time measurement method according to an aspect of the present invention is a time measurement method executed by a time measurement apparatus, the time measurement method including setting a first dead time during which a detection signal, which is a phenomenon detected and output by a detector, is not input to a time measurement instrument to an integral multiple of a repetition period of the phenomenon, and deriving and outputting time information related to the detection signal based on the detection signal output from the time measurement instrument, in which the first dead time may be longer than a second dead time of the time measurement instrument itself.

Advantageous Effects of Invention

According to one aspect of the present invention, it is possible to appropriately acquire a time waveform related to a phenomenon.

DESCRIPTION OF EMBODIMENTS

Hereinafter, embodiments of a time measurement apparatus, a time measurement method, and a fluorescence lifetime measurement apparatus according to an aspect of the present invention will be described in detail with reference to the drawings.

Figure 1:
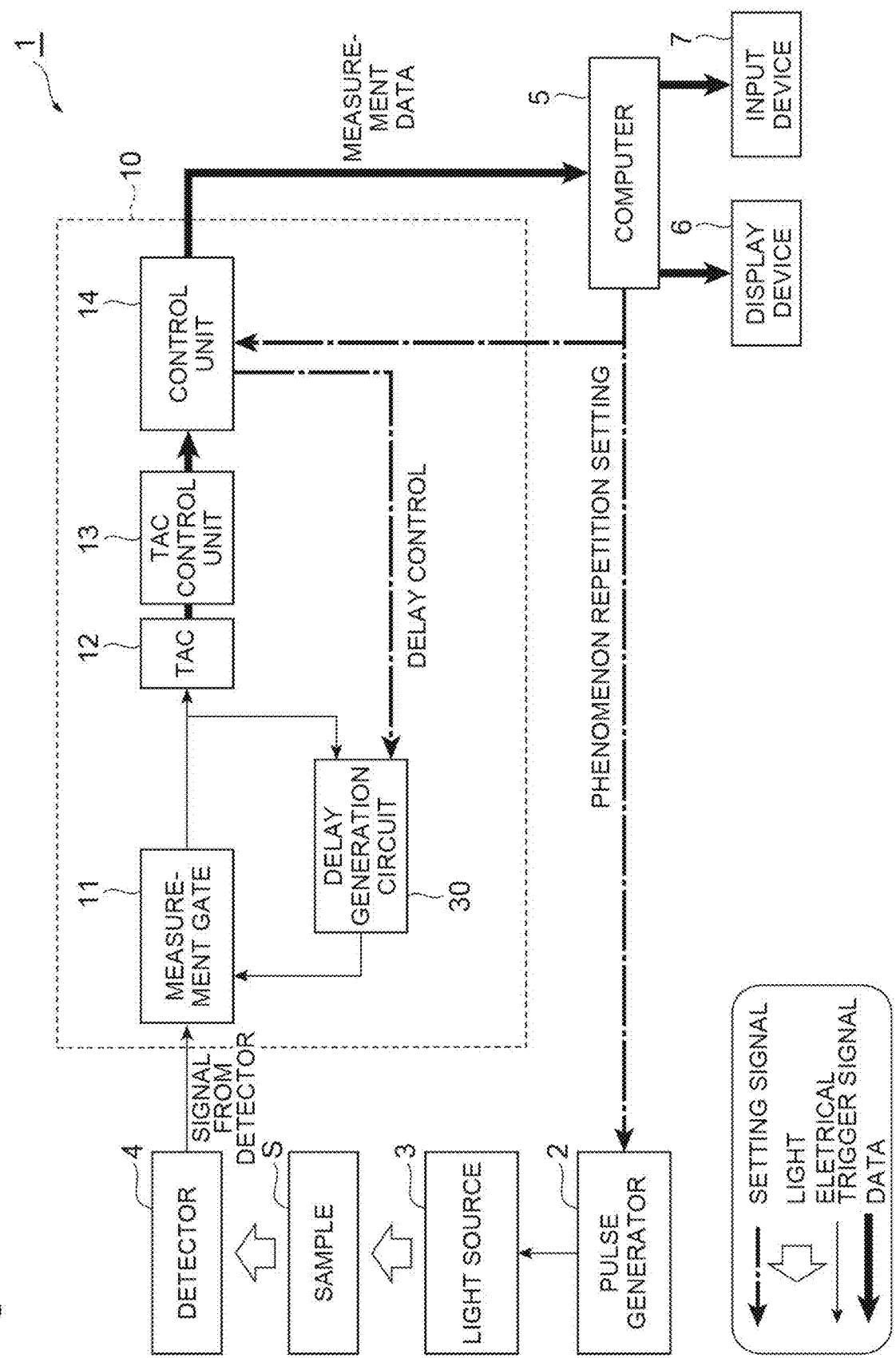
FIG. 1 is a diagram schematically illustrating a fluorescence lifetime measurement apparatus according to the present embodiment.

FIG. 1 is a diagram schematically illustrating a fluorescence lifetime measurement apparatus 1 according to the present embodiment. The fluorescence lifetime measurement apparatus 1 is a apparatus that measures the lifetime of fluorescence emitted from a sample S (measurement target).

Fluorescence spectra of organic materials and fluorescence probes are important parameters for controlling and evaluating the functions and characteristics of samples, such as a peak wavelength and fluorescence intensity. However, fluorescence spectra acquire temporally integrated information, and thus in a case where a sample contains a plurality of substances or reaction systems, only the integrated information can be obtained. In such a case, as means for evaluating the function and characteristics of a sample, fluorescence lifetime measurement for measuring a time required for the sample to return to a ground state after being photoexcited by pulsed light in a time domain of sub-nanoseconds to milliseconds is effective. In the fluorescence lifetime measurement apparatus 1 according to the present embodiment, a fluorescence detection timing is derived by a time measurement apparatus 10 to be described below, the frequency distribution of the detection timing is obtained by detecting fluorescence a plurality of times, and the fluorescence lifetime of a sample S is estimated based on the frequency distribution.

As illustrated in FIG. 1, the fluorescence lifetime measurement apparatus 1 is configured to include a pulse generator 2 (signal generation unit), a light source 3, a detector 4, a computer 5 (arithmetic operation unit), a display apparatus 6, an input apparatus 7, and a time measurement apparatus 10. Note that, in FIG. 1, a clock generation circuit 9 (see FIG. 2), which will be described later, in the configuration of the fluorescence lifetime measurement apparatus 1 is not illustrated.

The pulse generator 2 generates a pulse signal for controlling the output of light from the light source 3, and outputs the pulse signal to the light source 3. The pulse generator 2 generates a pulse signal based on an instruction given from the computer 5. More specifically, the pulse generator 2 receives a setting signal indicating a fluorescence repetition period from the computer 5 and generates a pulse signal according to the setting signal.

The light source 3 outputs excitation light emitted to the sample S based on the pulse signals output from the pulse generator 2. That is, the light source 3 irradiates the sample S with generated light. As the light source 3, a light emitting diode (LED) light source, a laser light source, a super luminescent diode (SLD) light source, a lamp-based light source, or the like can be used. The intensity of the excitation light may be set, for example, to the extent that one photon is emitted when the sample S is irradiated with the excitation light. Fluorescence corresponding to the excitation light is output from the sample S irradiated with the excitation light.

The detector 4 detects fluorescence from the sample S irradiated with light emitted from the light source 3, and outputs a detection signal to a measurement gate 11 (details will be described later) of the time measurement apparatus 10. As the detector 4, a photomultiplier tube, an avalanche photodiode, a hybrid photo detector (HPD), a superconductive single photon detector (SSPD), or the like can be used.

The computer 5 derives fluorescence lifetime based on the measurement results output from the time measurement apparatus 10 (in more detail, the control unit 14). Specifically, the computer 5 derives the frequency distribution of a fluorescence detection timing from time information of fluorescence (fluorescence detection timing) included in the measurement results, and obtains the fluorescence lifetime of the sample S from the frequency distribution. The computer 5 also outputs a setting signal indicating a repetition period of fluorescence to the pulse generator 2 and the control unit 14. The computer 5 is constituted by an arithmetic operation unit such as a CPU and a storage unit such as a RAM or a flash memory. Note that the computer 5 may take charge of the function of the control unit 14 of the time measurement apparatus 10.

The display apparatus 6 is a display electrically coupled to the computer 5, and displays analysis results for the fluorescence lifetime of the sample S described above. The input apparatus 7 is a keyboard, a mouse, or the like, and can input and set analysis conditions and measurement conditions for the fluorescence lifetime.

The time measurement apparatus 10 is a time measurement apparatus that calculates a time from when a first trigger signal is input to when a second trigger signal is input as a measurement time. The time measurement apparatus 10 can be applied to various apparatuses and systems that derive a difference in input timing between two signals (the first trigger signal and the second trigger signal) input at different timings from the two signals. In the present embodiment, as described above, the time measurement apparatus 10 is applied to the fluorescence lifetime measurement apparatus 1 that measures the lifetime of fluorescence emitted from the sample S.

As illustrated in FIG. 1, the time measurement apparatus 10 includes a measurement gate 11 (first switching unit) and a time-analog-converter (TAC) circuit 12 (time-amplitude converter) and a TAC control unit 13 (converter) that constitute a first time measurement instrument, a control unit 14 (setting unit, derivation unit), and a delay generation circuit 30. Note that, in FIG. 1, a digital counter 20 (see FIG. 2), which will be described later, in the configuration of the time measurement apparatus 10 is not illustrated. The digital counter 20 may be provided in the TAC control unit 13 or may be provided separately from the TAC control unit 13.

The TAC circuit 12 is a circuit of a time-amplitude converter circuit that outputs a time difference between the input of the first trigger signal and the input of the second trigger signal as an analog signal (amplitude). The TAC circuit 12 is configured to be able to measure, for example, a time of 10 ns. Specifically, the TAC circuit 12 outputs a detection signal, which is output by the detector 4 detecting fluorescence (phenomenon), as a first trigger signal, outputs a clock signal output from the clock generation circuit 9 (see FIG. 2) as a second trigger signal, and outputs an analog signal (amplitude) corresponding to a time between the detection signal and the clock signal as a measurement signal to the TAC control unit 13. That is, the TAC circuit 12 receives inputs of the detection signal, which is output by the detector 4 detecting fluorescence (phenomenon), and the clock signal, and outputs the measurement signal corresponding to the time (time corresponding to the detection signal) between the detection signal and the clock signal. The TAC circuit 12 receives the detection signal input through the measurement gate 11.

The TAC control unit 13 is an AD converter that converts the analog signal (amplitude), which is the measurement signal output from the TAC circuit 12, into a digital signal and outputs the digital signal. The TAC control unit 13 outputs the digital signal after AD conversion to the control unit 14 as a measurement signal.

The measurement gate 11 receives an input of the detection signal, which is the first trigger signal, from the detector 4 and outputs the detection signal to the TAC circuit 12. The measurement gate 11 is provided between the detector 4 and the TAC circuit 12 and is set to be in a first state where the detection signal is transmitted in the direction of the TAC circuit 12 or a second state where the detection signal is not transmitted in the direction of the TAC circuit 12. That is, measurement gate 11 is set to be in any one of the first state or the second state at all times. A dead time (gate dead time) is set in the measurement gate 11. The dead time (gate dead time) here means a time during which the measurement gate 11 is set to be in a state where the detection signal is not transmitted in the direction of the TAC circuit 12, that is, the above-described second state. The gate dead time is set by the control unit 14 (setting unit) through the delay generation circuit 30, and is a time which is an integral multiple of a repetition period of a phenomenon (for example, fluorescence detected by the detector 4). In addition, the gate dead time set by the control unit 14 is longer than the dead time of the TAC circuit 12 itself. The dead time of the TAC circuit 12 itself is a time during which the TAC circuit 12 cannot measure a time again for a certain period of time after measuring the time.

In detail, the measurement gate 11 receives a delay signal from the delay generation circuit 30, and is switched between the above-described first state and second state based on the delay signal. That is, the measurement gate 11 is set to be in the first state to transmit the detection signal and is then set to be in the second state until the delay signal is input. After the measurement gate 11 receives the input of the delay signal, the measurement gate 11 is set to be in the first state until a new detection signal is input. The delay signal is a signal delayed by a delay amount that is an integral multiple of a fluorescence repetition period (details will be described later). For this reason, the measurement gate 11 is set to be in the second state until the delay signal is input after the detection signal is transmitted, and thus a gate dead time being the second state can be appropriately set to an integral multiple of a fluorescence repetition period.

The control unit 14 function as a setting unit that sets a gate dead time during which the measurement gate 11 is set to be in the second state, in the measurement gate 11 and a derivation unit that derives and outputs time information related to a detection signal based on the measurement signal output from the TAC control unit 13.

As a function as the setting unit, the control unit 14 sets a time, which is a time being an integral multiple of a repetition period of fluorescence detected by the detector 4 and is longer than the dead time of the TAC circuit 12 itself, in the measurement gate 11 as a gate dead time. The control unit 14 sets the gate dead time in the measurement gate 11 via the delay generation circuit 30. The control unit 14 performs the delay control of the delay generation circuit 30 based on a setting signal (a signal indicating a fluorescence repetition period) which is input from the computer 5. That is, the control unit 14 sets a delay amount, which is an integral multiple of the repetition period, in the delay generation circuit 30 in advance based on the setting signal. The delay generation circuit 30 outputs a delay signal delayed by the set delay amount to the measurement gate 11. In detail, the delay generation circuit 30 is configured such that a detection signal having passed through the measurement gate 11 set to be in the first state is input (the detection signal is input similarly to the TAC circuit 12), and outputs the delay signal delayed by the delay amount set by the control unit 14 for the detection signal to the measurement gate 11 when receiving the input of the detection signal. As described above, the measurement gate 11 is set to be in the second state (the state of the gate dead time) until the measurement gate 11 receives an input of the delay signal after transmitting the detection signal. Thereby, the gate dead time of the measurement gate 11 can be set to an integral multiple of a fluorescence repetition period.

Figure 2:
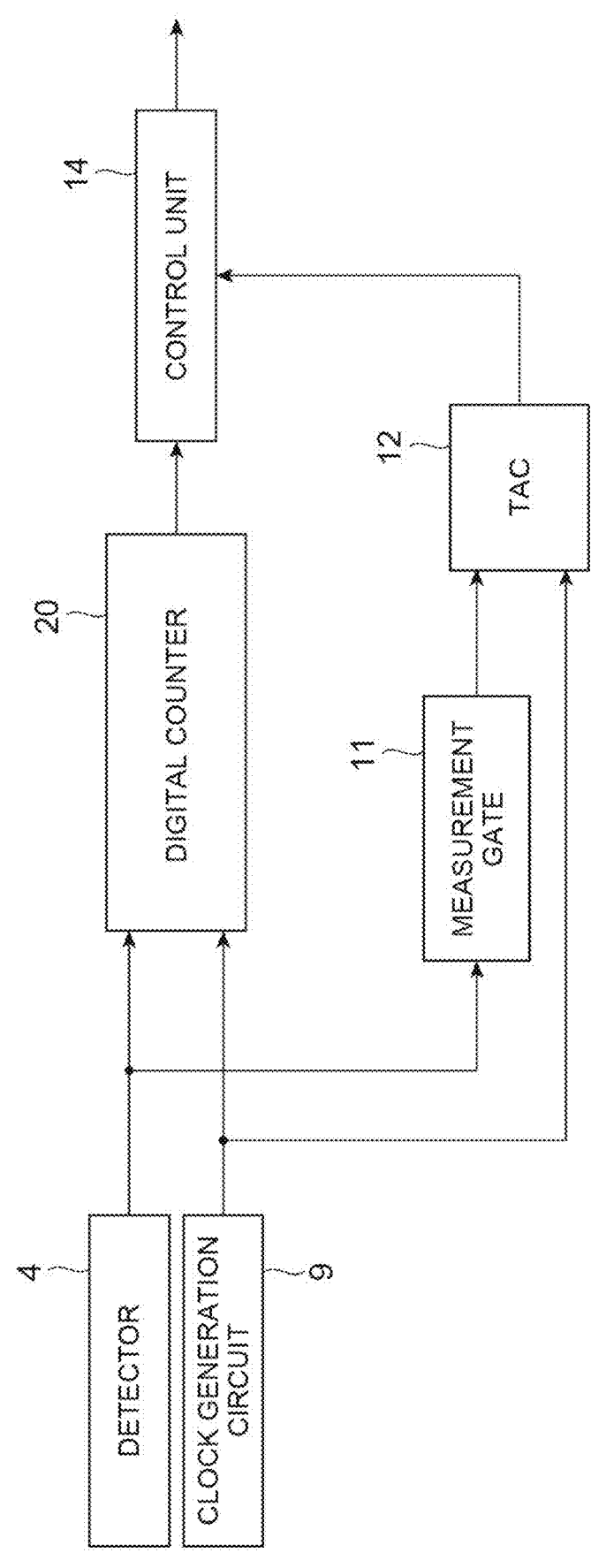
FIG. 2 is a diagram illustrating the principle of time measurement in a TAC circuit.

As a function as a derivation unit, the control unit 14 derives and outputs time information related on a detection signal detected by the detector 4, based on a count signal output from the digital counter 20 (see FIG. 2) and a measurement signal output from the TAC circuit 12 and converted into a digital signal by the TAC control unit 13. As illustrated in FIG. 2, the digital counter 20 is a counter to which a detection signal from the detector 4 and a clock signal from the clock generation circuit 9 are input. The digital counter 20 operates in synchronization with the clock signal and outputs the count signal to the control unit 14 in accordance with the clock signal (by counting the clock signal). Although the digital counter 20 can perform long-time measurement for a detection signal, it is difficult to increase a time resolution. The control unit 14 combines a time measurement result of the digital counter 20 and a time measurement result of the TAC circuit 12 with a high time resolution to achieve high time resolution and long-time measurement of time information related to the detection signal.

Figure 3:
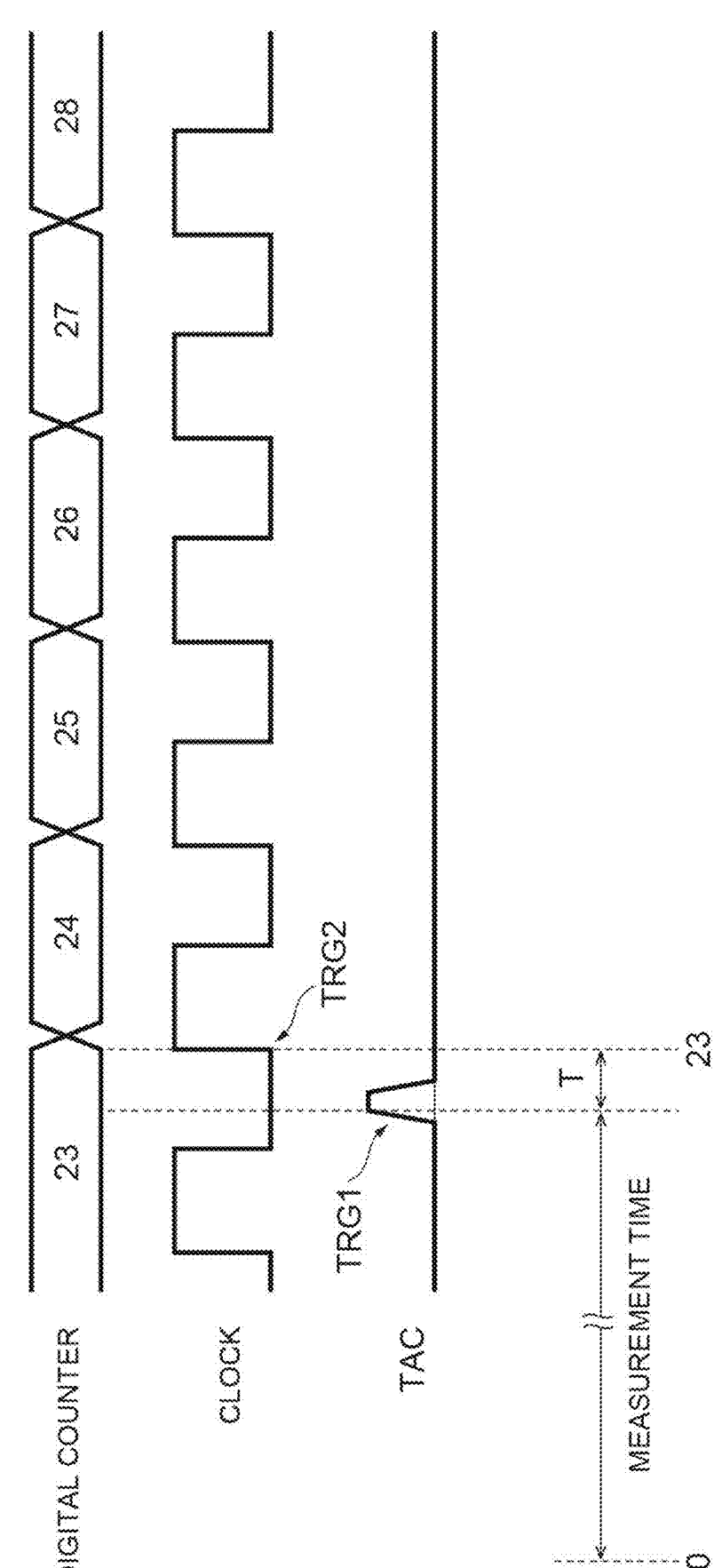
FIG. 3 is a diagram illustrating the principle of time measurement in the TAC circuit.
Figure 4:
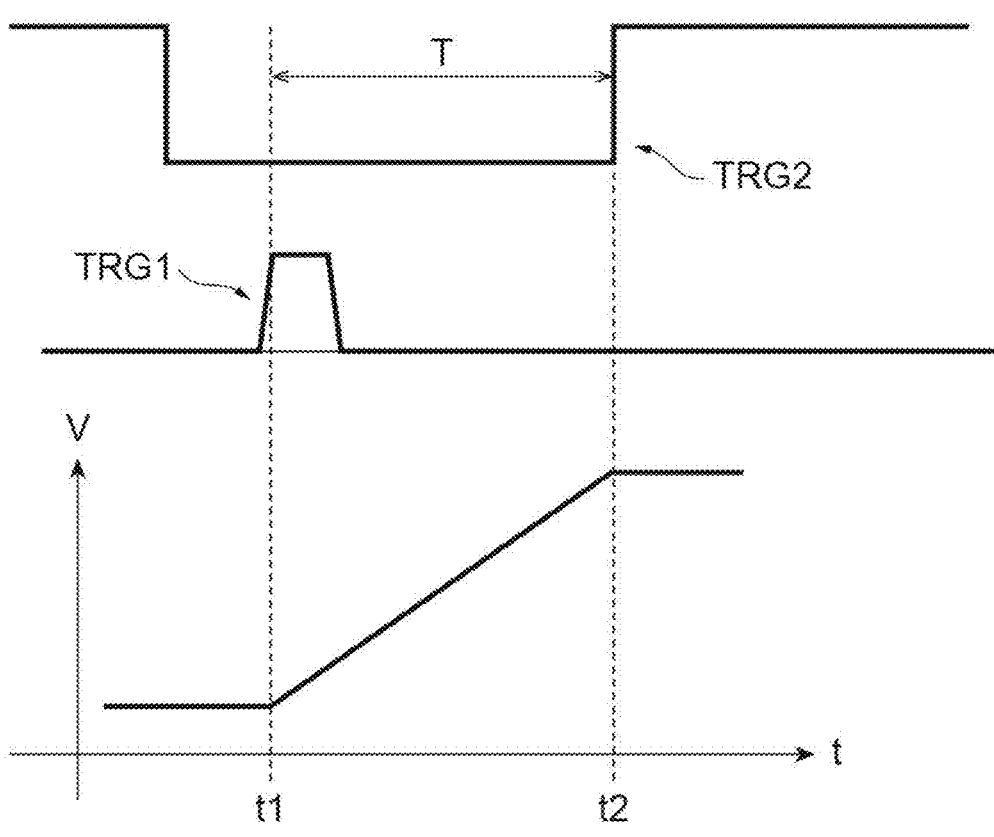
FIG. 4 is a diagram illustrating the principle of time measurement in the TAC circuit.

FIGS. 3 and 4 are diagrams illustrating the derivation of the time information described above. In FIGS. 3 and 4, the horizontal axis indicates a time axis. As illustrated in FIG. 3, the digital counter 20 counts clock signals and outputs a count signal. FIG. 3 illustrates an example in which the digital counter 20 outputs count signals indicating 23, 24, 25, 26, 27, and 28. As described above, the digital counter 20 operates in synchronization with a clock signal. In addition, as illustrated in FIG. 3, now, it is assumed that the TAC circuit 12 measures a time difference T between the input of a detection signal TRG1 from the detector 4 and the input of a clock signal TRG2 immediately after the detection signal TRG1. In the measurement signal output by the TAC circuit 12, as illustrated in FIG. 4, a voltage (amplitude) is started to increase in response to the detection signal TRG1 from a timing (time t1) when the detection signal TRG1 is input, and a voltage (amplitude) becomes constant in response to the clock signal TRG2 from a timing (time t2) when the clock signal TRG2 is input.

The control unit 14 derives time information indicating a time until a detection signal is input to the TAC circuit 12 by subtracting a time indicated by the measurement signal from a time corresponding to a count value indicated by the count signal. That is, in the example illustrated in FIG. 3, the control unit 14 derives time information (23-T) indicating a time until the detection signal TRG1 is input to the TAC circuit 12 by subtracting a time difference T, which is time information indicated by the measurement signal, from 23 which is a time corresponding to the count value indicated by the count signal. Such time information can be derived by correspondence of the clock signal input to the digital counter 20 and the clock signal input to the TAC circuit 12 (the count value indicated by the clock signal input to the TAC circuit 12 is uniquely determined). The control unit 14 outputs the derived time information (measurement result) to the computer 5.

Next, the meaning (effect) of setting a gate dead time that is an integral multiple of a fluorescence repetition period will be described with reference to FIGS. 5 to 18. FIGS. 5 to 12 are diagrams illustrating acquisition of a fluorescence time waveform in the fluorescence lifetime measurement apparatus 1 according to the present embodiment. FIGS. 13 to 18 are diagrams illustrating acquisition of a fluorescence time waveform in the fluorescence lifetime measurement apparatus 1 according to a comparative example. In FIGS. 5 to 18, the horizontal axis represents a time.

Figure 5:
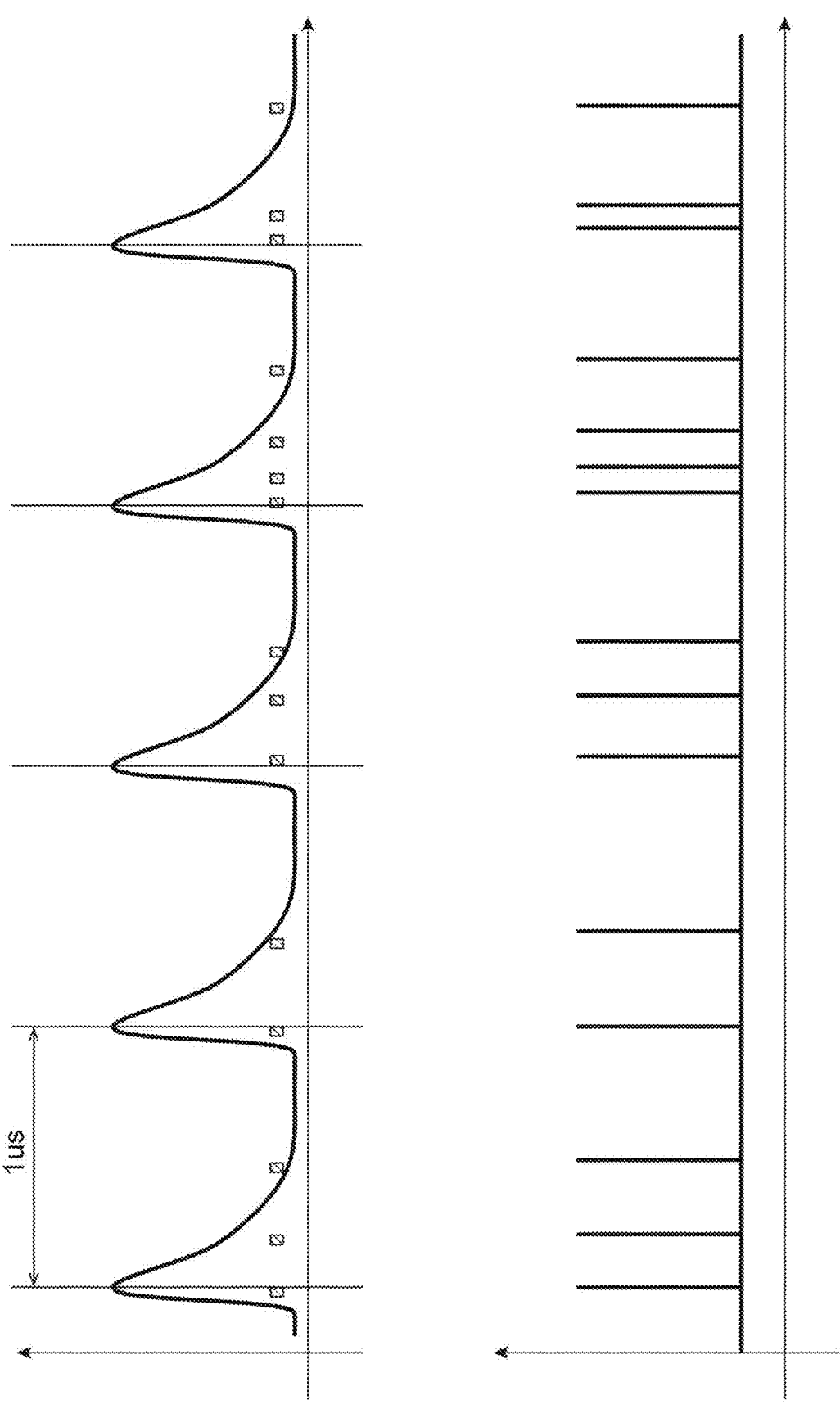
FIG. 5 is a diagram illustrating acquisition of a time waveform.

Now, a case where fluorescence with a repetition period is incident as illustrated in the upper part of FIG. 5 is conceivable. In an example illustrated in FIG. 5, the number of frequencies of a pulse signal output from the pulse generator 2 is 1 MHz, and a fluorescence repetition period of 1 µs. It is assumed that fluorescence emission occurs along a curve illustrated in the upper part of FIG. 5, and that a plurality of squares illustrated in the upper part of FIG. 5 indicate the generation of photons associated with fluorescence (hereinafter, the same applies to FIG. 6 and the subsequent drawings). In a lower part of FIG. 5, detection signals output from the detector 4 are illustrated. As illustrated in the lower part of FIG. 5, a detection signal corresponding to each photon is output from the detector 4 at a timing when each photon is detected due to the generation of the photons.

Here, in the TAC circuit 12, after a photon is input (after a time is measured), a dead time during which a time cannot be measured again for a certain period of time occurs. In a general fluorescence lifetime measurement apparatus (for example, a fluorescence lifetime measurement apparatus according to a comparative example to be described later), there is an attempt to reduce a dead time of the apparatus as much as possible in order to reduce the number of photons that are not counted, and a dead time other than the dead time of the TAC circuit 12 itself is not provided. In this regard, in the fluorescence lifetime measurement apparatus 1 according to the present embodiment, a time that is an integral multiple of a fluorescence repetition period (and is longer than the dead time of the TAC circuit 12 itself) is set in the measurement gate 11 as a gate dead time. In a lower part of FIG. 6, an example in which a gate dead time that is one time the fluorescence repetition period (the same as a fluorescence repetition period) is set in the measurement gate 11 is indicated. Note that a "dead time" in each of FIGS. 6 to 10 indicates a gate dead time.

Figure 6:
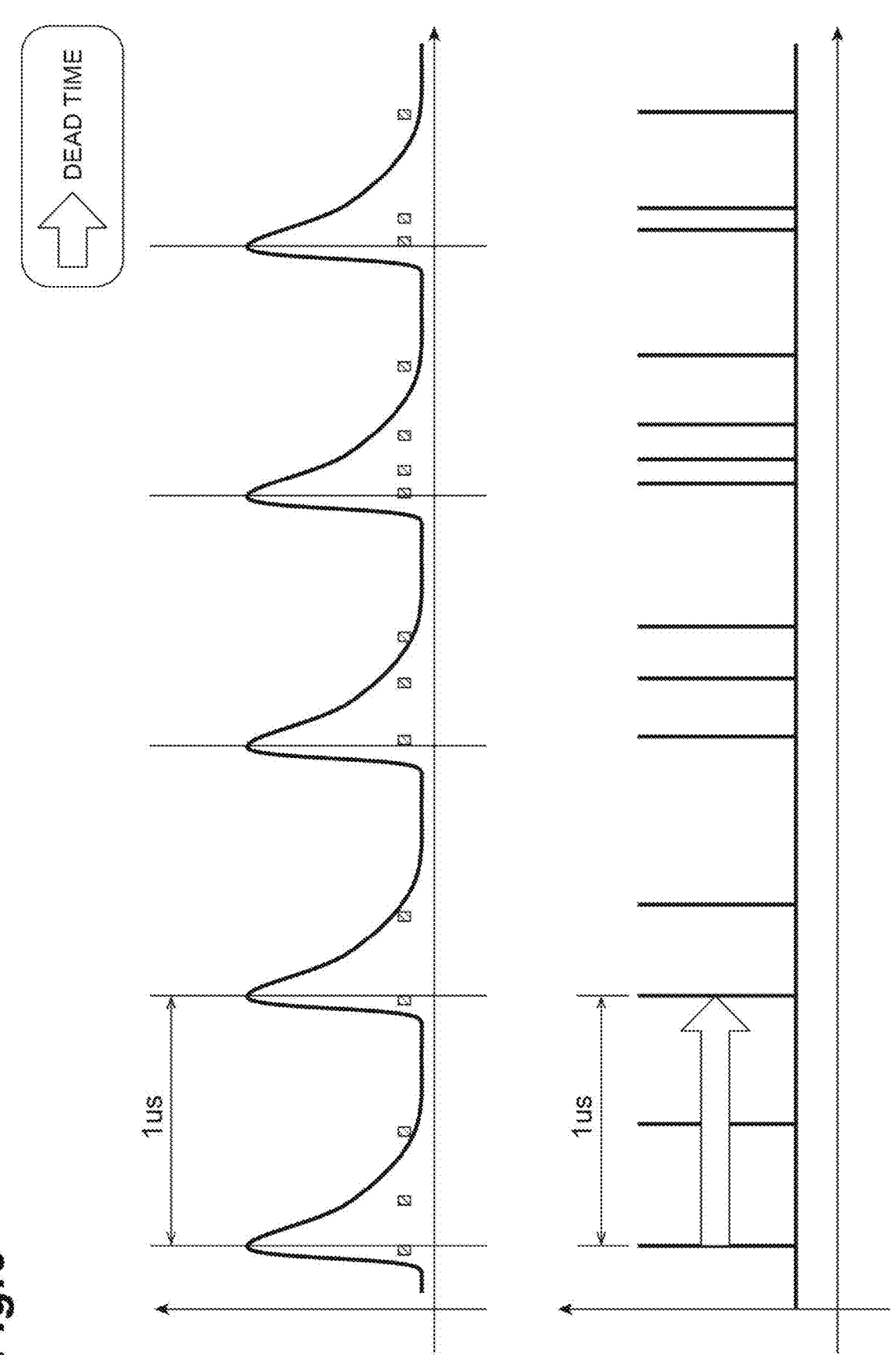
FIG. 6 is a diagram illustrating acquisition of a time waveform.
Figure 7:
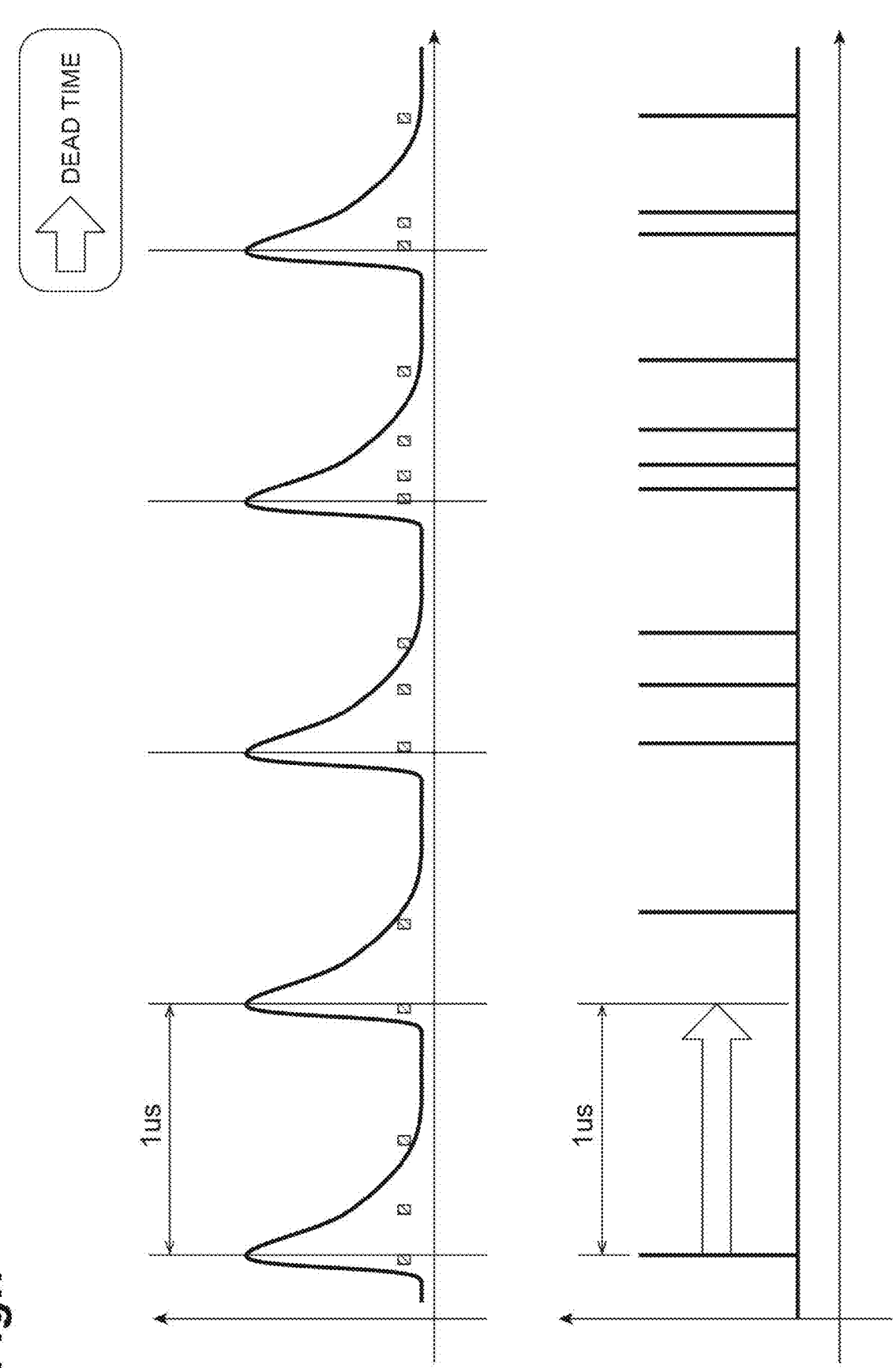
FIG. 7 is a diagram illustrating acquisition of a time waveform.
Figure 8:
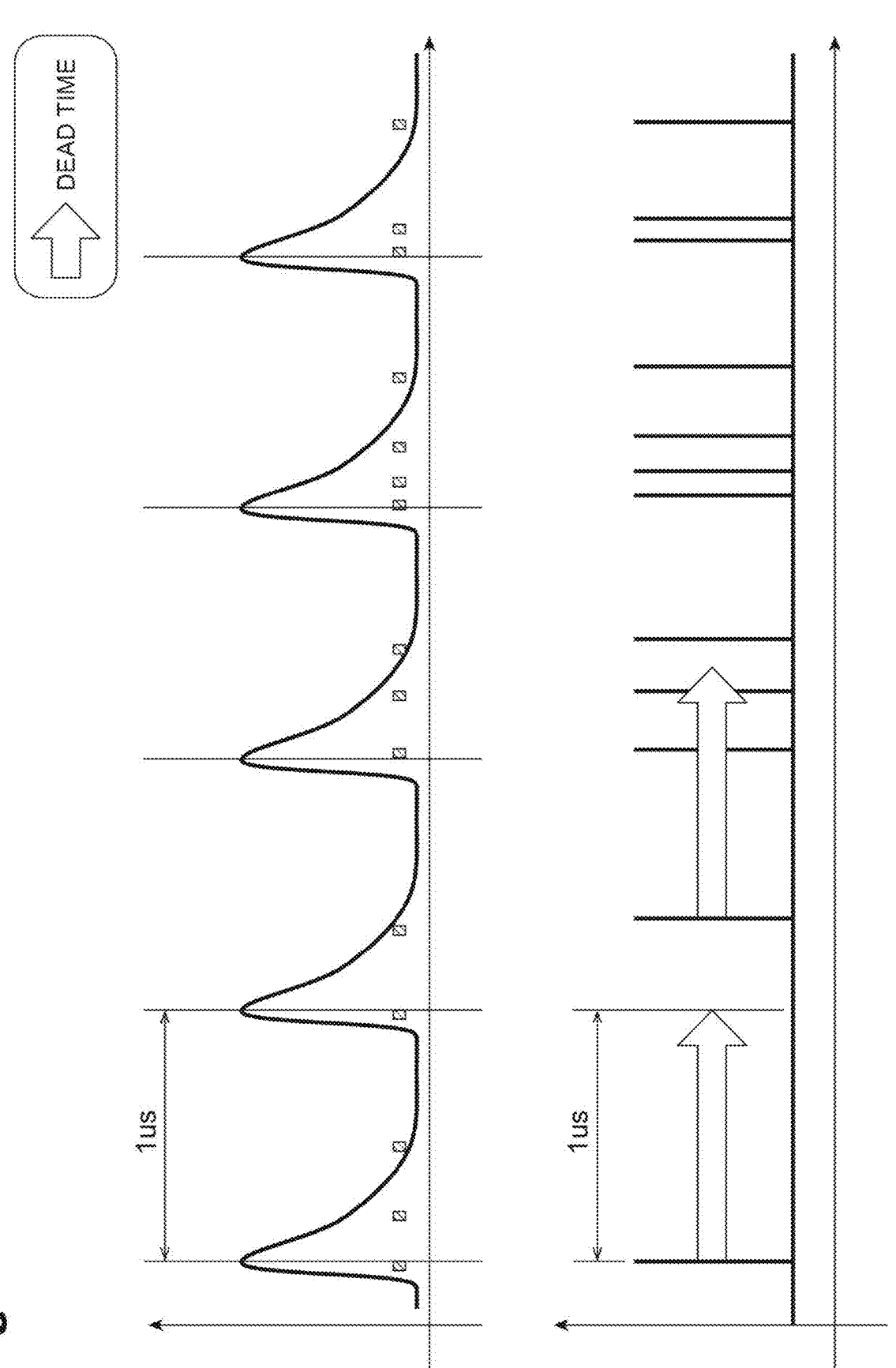
FIG. 8 is a diagram illustrating acquisition of a time waveform.
Figure 9:
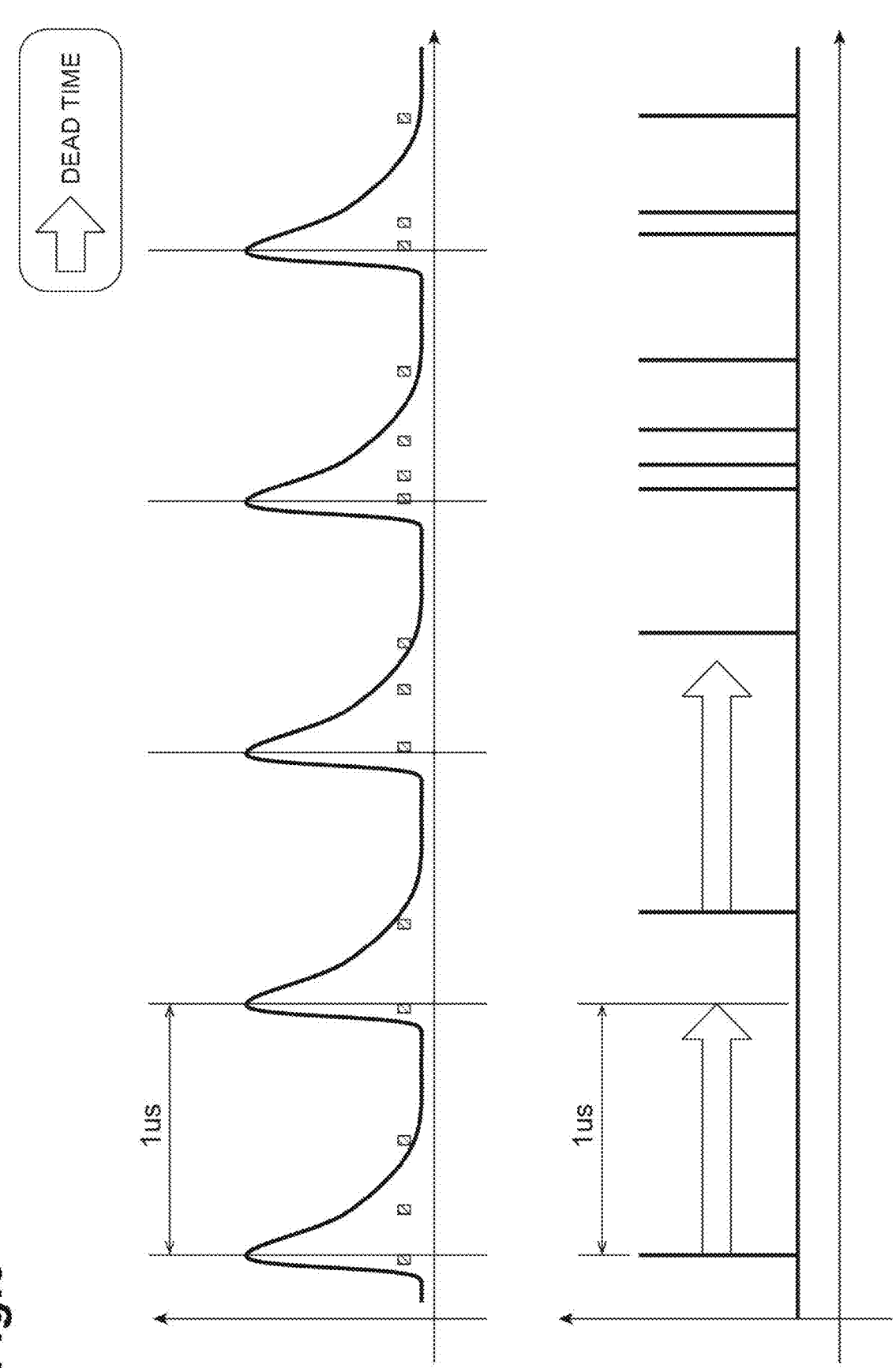
FIG. 9 is a diagram illustrating acquisition of a time waveform.
Figure 10:
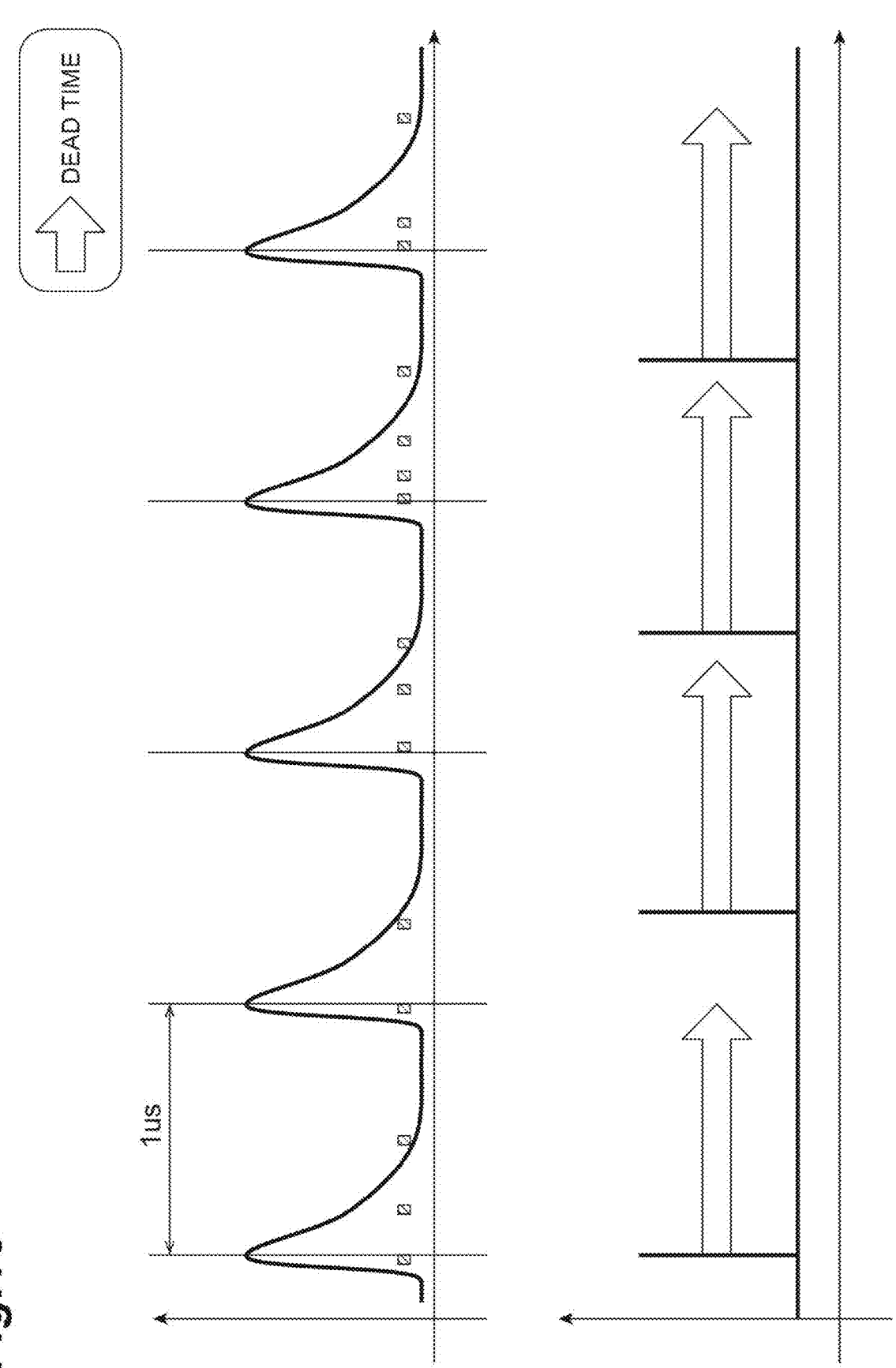
FIG. 10 is a diagram illustrating acquisition of a time waveform.

When a gate dead time (first gate dead time) illustrated in FIG. 6 occurs after a first photon is measured, a signal during the first gate dead time cannot be acquired, and thus a detection signal that actually passes through the measurement gate 11 is as illustrated in a lower part of FIG. 7 in consideration of the first gate dead time. In addition, when the first gate dead time is terminated, and the next photon is measured, a gate dead time (second gate dead time) illustrated in FIG. 8 occurs again. Since a signal cannot be acquired even during the second gate dead time, a detection signal that actually passes through the measurement gate 11 is as illustrated in a lower part of FIG. 9 in consideration of the second gate dead time. In this manner, when a gate dead time occurring after photon measurement is repeated, a detection signal that actually passes through the measurement gate 11 is as illustrated in FIG. 10.

Figure 11:
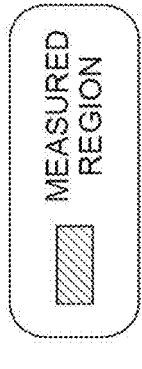
FIG. 11 is a diagram illustrating acquisition of a time waveform.
Figure 12:
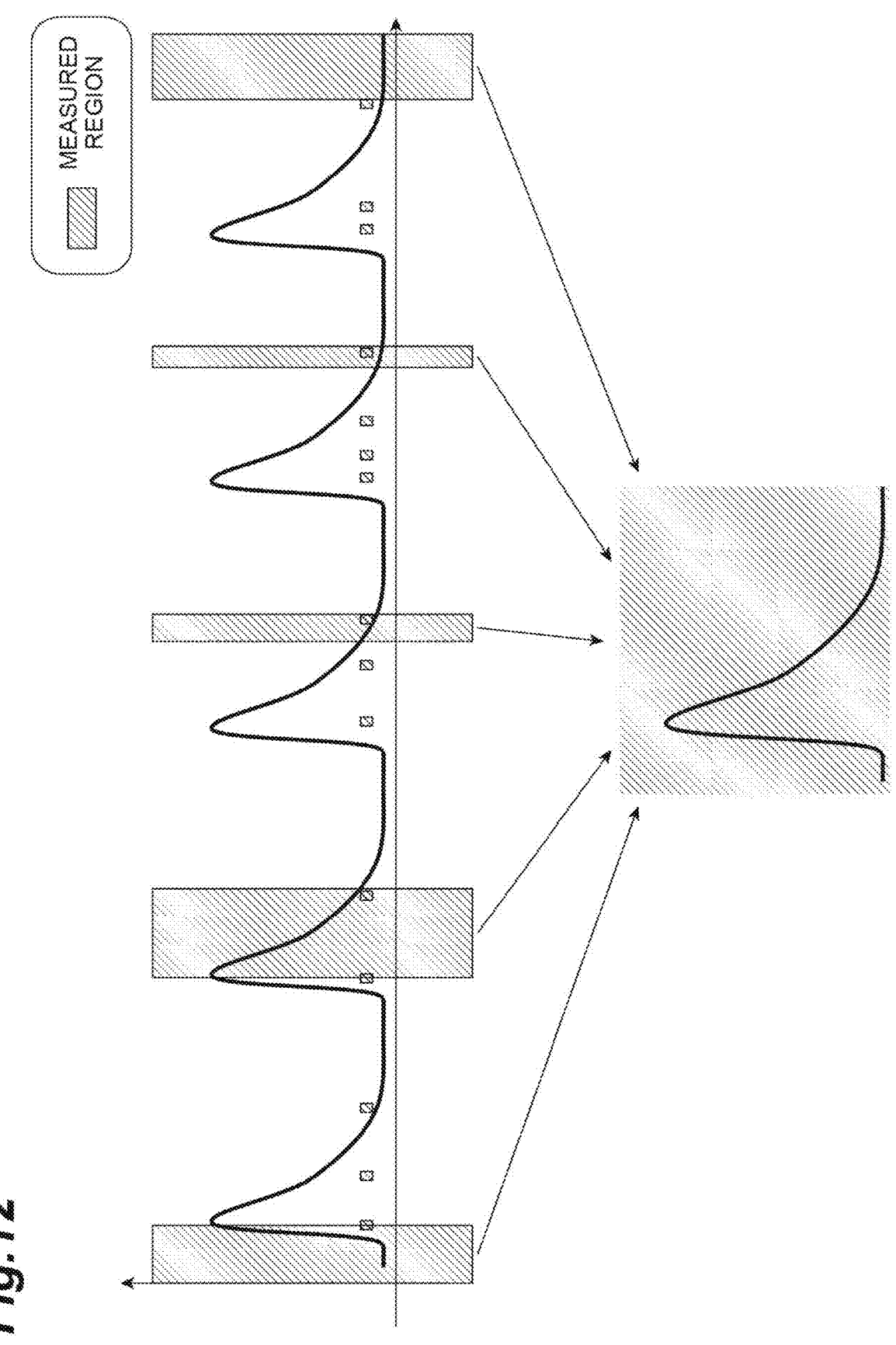
FIG. 12 is a diagram illustrating acquisition of a time waveform.
Figure 13:
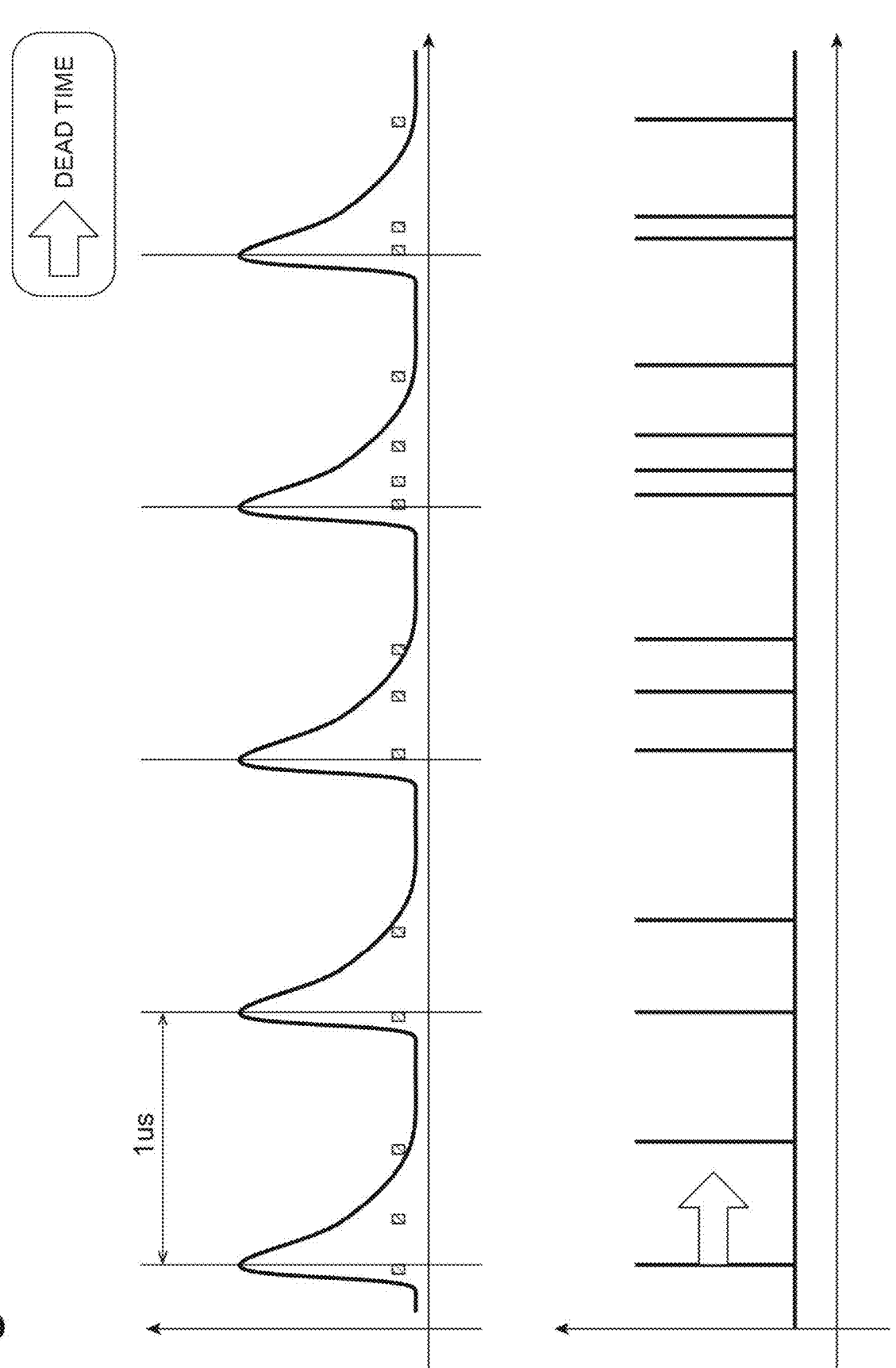
FIG. 13 is a diagram illustrating acquisition of a time waveform according to a comparative example.
Figure 14:
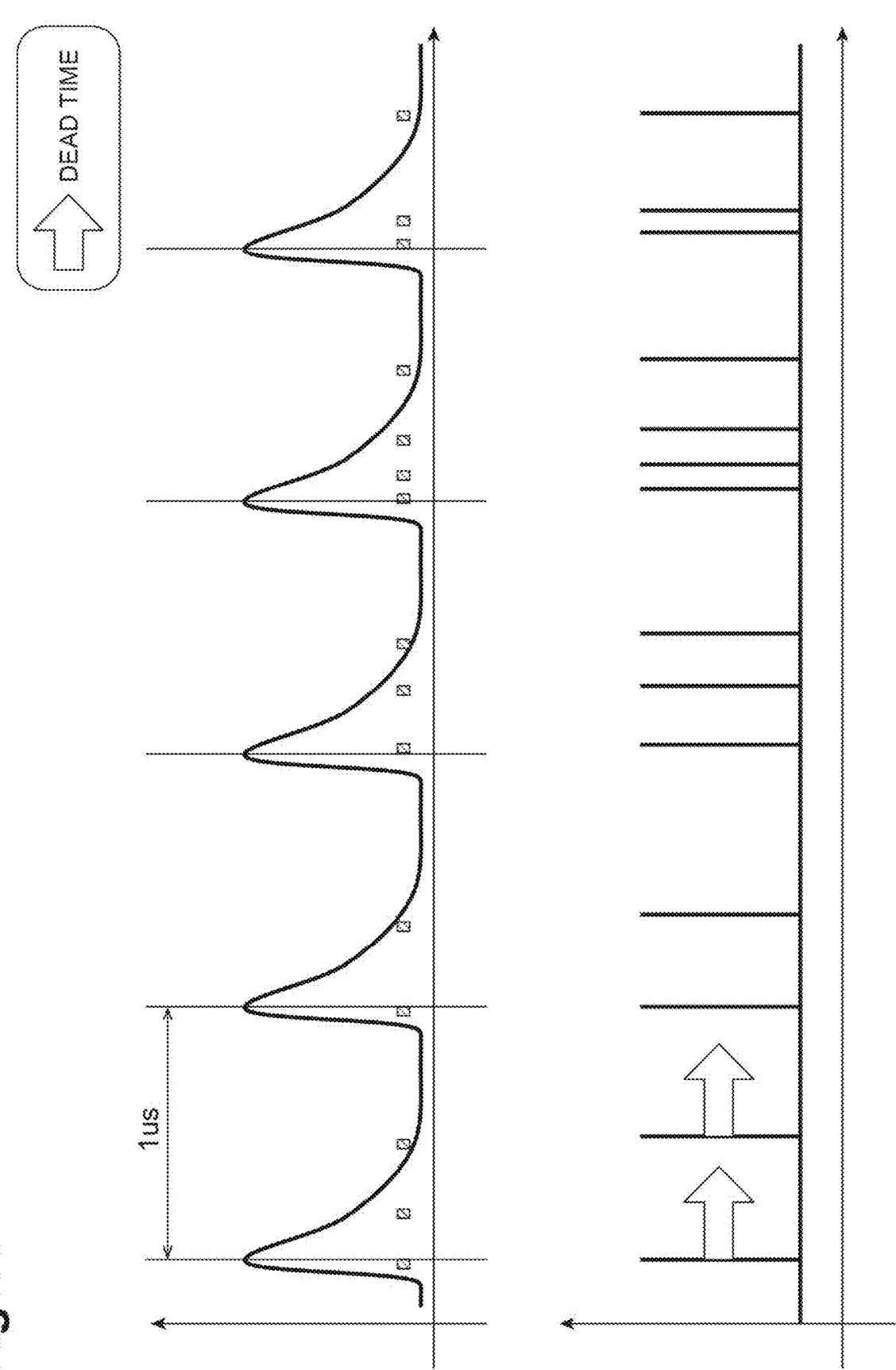
FIG. 14 is a diagram illustrating acquisition of a time waveform according to a comparative example.
Figure 15:
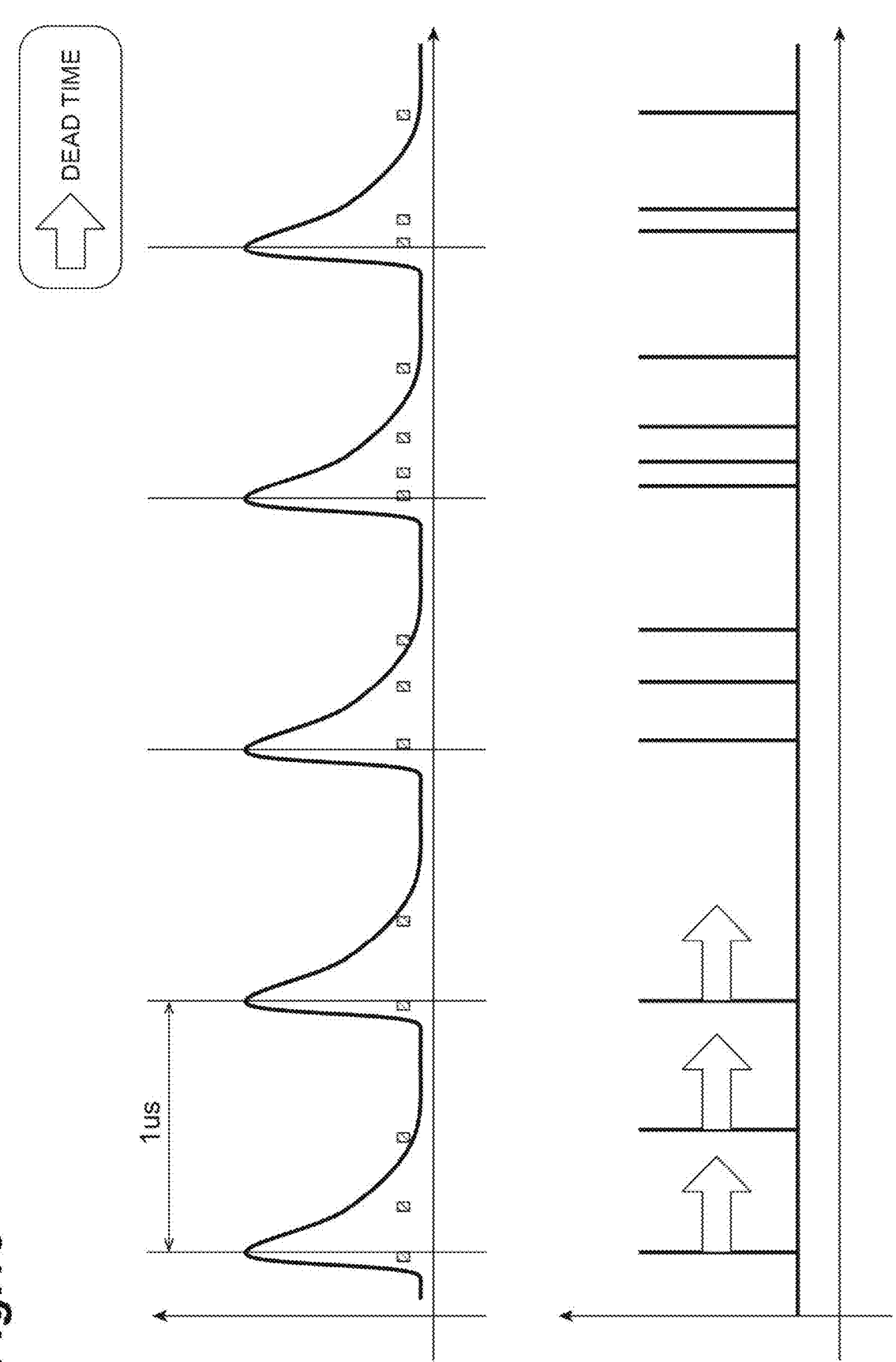
FIG. 15 is a diagram illustrating acquisition of a time waveform according to a comparative example.

Here, a time during which time measurement can be performed by such a fluorescence lifetime measurement apparatus (a time during which photons can be measured at any time when photons are generated) is a time indicated by a "measured region" in FIG. 11. Such a state of time is a measurement standby state where measurement can be performed whenever photons are input. The measurement standby state is a time during which the fluorescence lifetime measurement apparatus 1 actually performs time measurement. Then, as illustrated in FIG. 12, when the "measured regions" are arranged in order of occurrence on the time axis, it can be understood that the original fluorescence emission curve appears. This is because the gate dead time is set to an integral multiple (one time in this case) of a fluorescence repetition period, and time waveforms before and after each dead time being synthesized are equivalent to a waveform of a temporally continuous fluorescence curve. As described above, it is possible to perform measurement as if continuous measurement has been performed (continuous acquisition of fluorescence waveforms) by setting a dead time that is an integral multiple of a fluorescence repetition period in the measurement gate 11.

Figure 16:
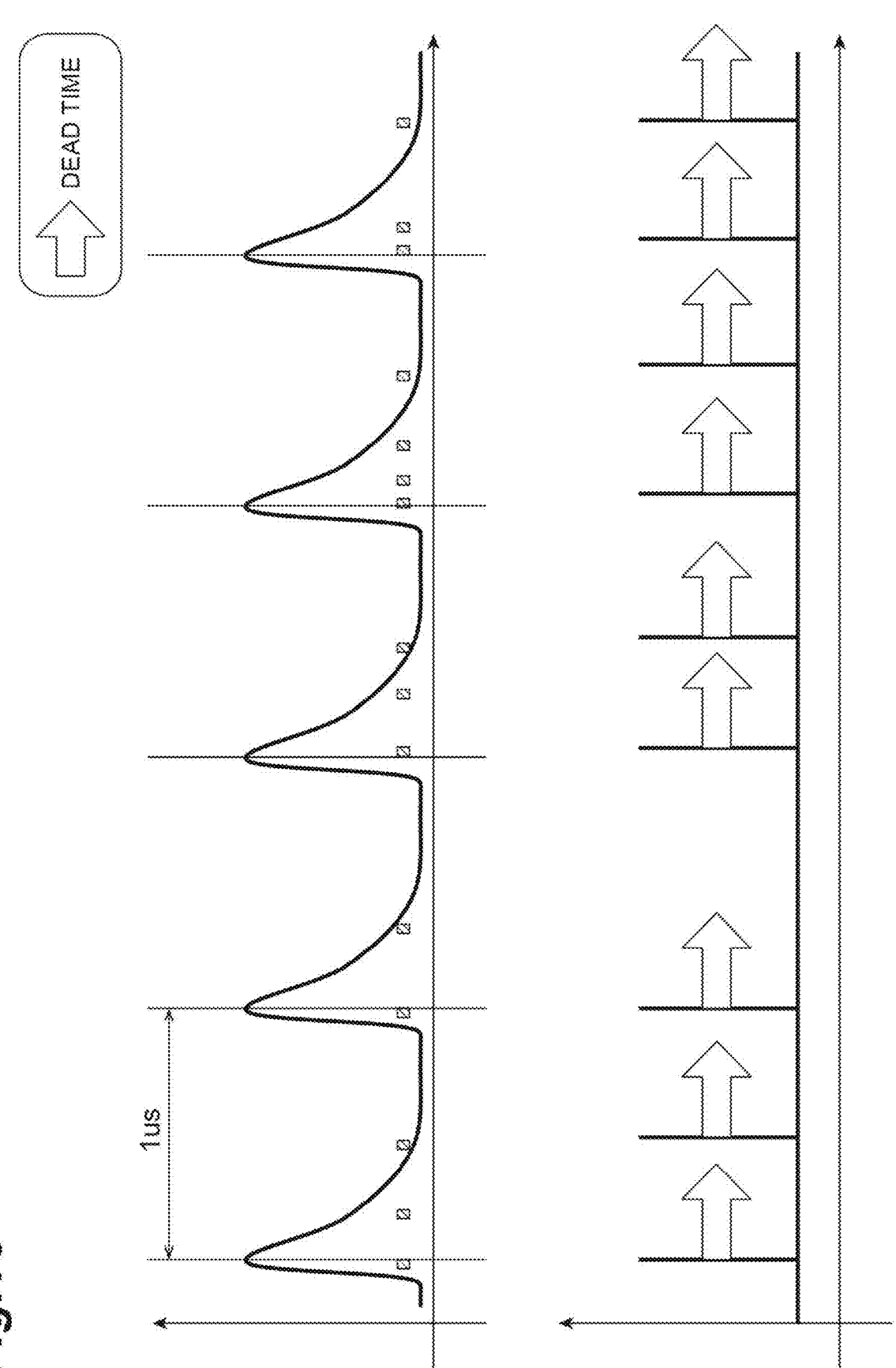
FIG. 16 is a diagram illustrating acquisition of a time waveform according to a comparative example.
Figure 17:
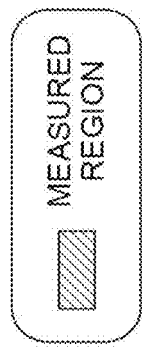
FIG. 17 is a diagram illustrating acquisition of a time waveform according to a comparative example.
Figure 18:
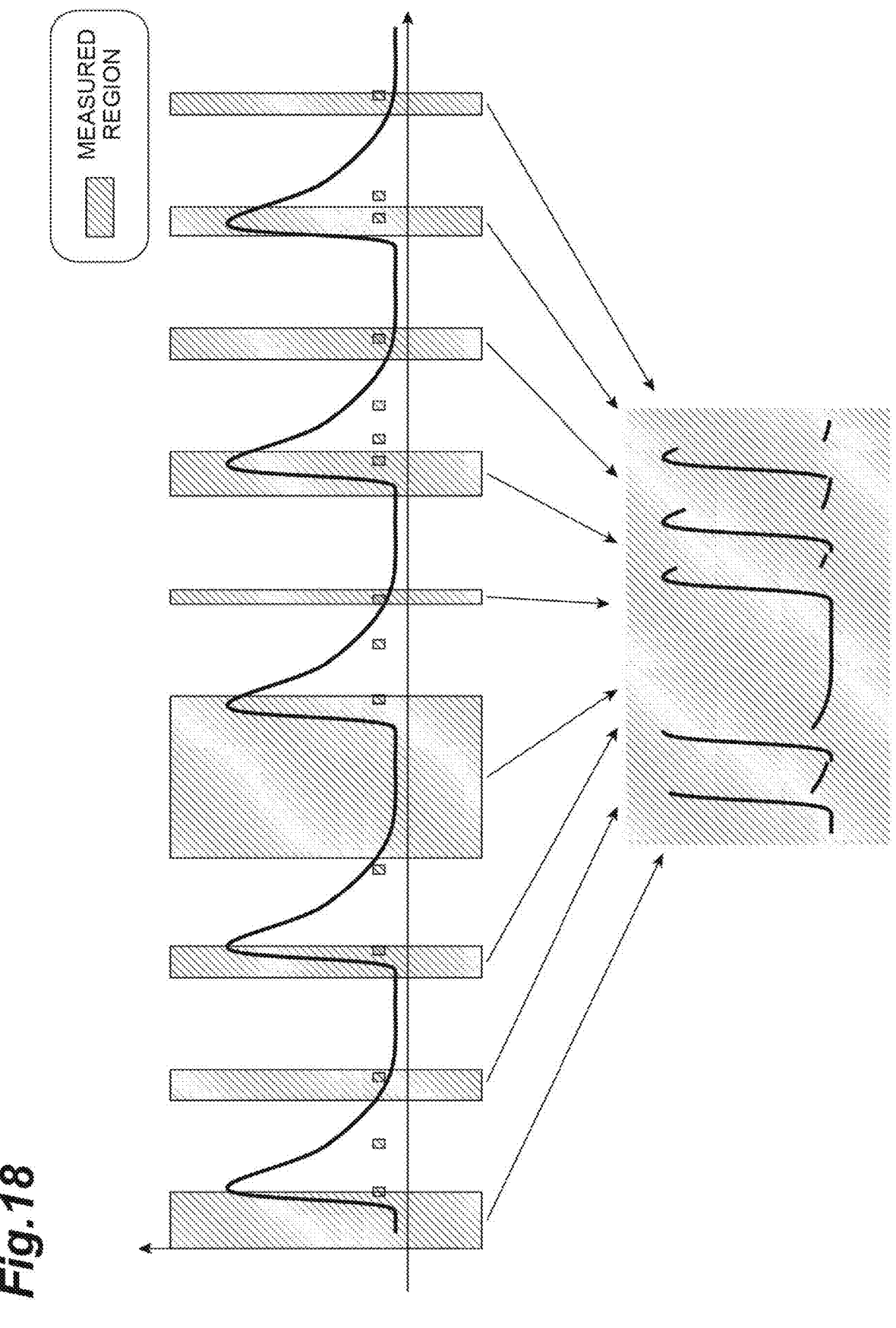
FIG. 18 is a diagram illustrating acquisition of a time waveform according to a comparative example.

Next, a configuration in which a gate dead time is not set (a configuration according to a comparative example) will be described with reference to FIGS. 13 to 18. Note that a "dead time" in each of FIGS. 13 to 16 means a dead time of the TAC circuit itself instead of a gate dead time. In the configuration according to the comparative example, as illustrated in the upper part of FIG. 13, a fluorescence repetition period is set to 1 µs, and a gate dead time is not set. Since a gate dead time is not set, dead time after photons are detected is only the dead time of the TAC circuit itself (which is a dead time shorter than the above-described gate dead time) as illustrated in the lower part of FIG. 13. After a first photon is measured, the dead time illustrated in FIG. 13 occurs, and photons cannot be measured during the dead time. In addition, when the first dead time is terminated, photons can be measured as illustrated in the lower part of FIG. 14, and a dead time occurs again after the photons are measured. When a second dead time is terminated, photons can be measured as illustrated in the lower part of FIG. 15, and a dead time occurs again after the photons are measured. In this manner, when the setting of a gate dead time after photon measurement is repeated, a detection signal that actually passes through a measurement gate is as illustrated in FIG. 16. In addition, when "measured regions" illustrated in FIG. 17 are arranged in order of occurrence on the time axis, a waveform illustrated in FIG. 18 is formed. The waveform is different from the above-described waveform illustrated in FIG. 12 and does not match the waveform of the original fluorescence curve at all. In this manner, in a configuration in which a dead time that is an integral multiple of a fluorescence repetition period is not set, it is not possible to perform measurement (continuous acquisition of fluorescence waveforms) as if continuous measurement has been performed.

Next, operations and effects of the time measurement apparatus 10 and the fluorescence lifetime measurement apparatus 1 according to the present embodiment will be described.

The time measurement apparatus 10 according to the present embodiment includes the TAC circuit 12 that receives an input of a detection signal, which is a phenomenon detected and output by the detector 4, and outputs a measurement signal corresponding to a time associated with the detection signal, the measurement gate 11 which is provided between the detector 4 and the TAC circuit 12 and is set to be in a first state where the detection signal is transmitted in the direction of the TAC circuit 12 or a second state where the detection signal is not transmitted in the direction of the TAC circuit 12, the control unit 14 that functions as a setting unit for setting a gate dead time, which is a time during which the measurement gate 11 is set to be in the second state, in the measurement gate 11, and the control unit 14 that functions as a derivation unit for deriving and outputting time information related to the detection signal based on the measurement signal output from the TAC circuit 12. The control unit 14 functioning as a setting unit sets a time, which is an integral multiple of a repetition period of fluorescence detected by the detector 4 and is longer than a dead time of the TAC circuit 12 itself, in the measurement gate 11 as a gate dead time.

In the time measurement apparatus 10 according to the present embodiment, switching is made between a first state where a detection signal is input to the TAC circuit 12 that outputs a measurement signal corresponding to a time associated with the detection signal and a second state where the detection signal is not input. A gate dead time that is an integral multiple of a repetition period of fluorescence and is longer than a dead time of the TAC circuit 12 itself is set in the measurement gate 11, and the measurement gate 11 is set to be in the second state described above during the gate dead time. In such a time measurement apparatus 10, a gate dead time that is an integral multiple of the repetition period of fluorescence is set in the measurement gate 11, and thus a time waveform in time information derived based on the measurement signal output from the TAC circuit 12 is equivalent to a waveform that is temporally continuous before and after the dead time (non-measurement state). Further, in the time measurement apparatus 10, since the gate dead time set in the measurement gate 11 is longer than the dead time of the TAC circuit 12 itself, the dead time of the TAC circuit 12 itself does not occur in spite of a measurement state where a detection signal is input to the TAC circuit 12, and thus it is possible to appropriately secure continuity of a time waveform before and after the gate dead time described above. As described above, according to the time measurement apparatus 10 of the present embodiment, it is possible to appropriately (continuously) acquire a time waveform related to a phenomenon.

The time measurement apparatus 10 may further include the delay generation circuit 30, the control unit 14 functioning as a setting unit may set a delay amount that is an integral multiple of a repetition period in the delay generation circuit 30, the delay generation circuit 30 may receive an input of a detection signal having passed through the measurement gate 11 set to be in a first state and output a delay signal delayed by the delay amount set by the control unit 14 functioning as a setting unit with respect to the detection signal to the measurement gate 11, and the measurement gate 11 may be set to be in the first state to transmit the detection signal, set to be in a second state until an input of the delay signal is received, receive the input of the delay signal, and then set to be in the first state until a new detection signal is input. With such a configuration, a gate dead time that is an integral multiple of a repetition period can be reliably set in the measurement gate 11.

The first time measurement instrument may include the TAC circuit 12 that outputs a measurement signal corresponding to a time associated with a detection signal as an analog signal, and the TAC control unit 13 that converts the analog signal output from the TAC circuit 12 into a digital signal and outputs it. By using the TAC circuit 12, which outputs a measurement signal as an analog signal, and the TAC control unit 13, it is possible to increase a time resolution in the measurement of a phenomenon as compared with a case where, for example, a time-digital converter is used.

The time measurement apparatus 10 may further include the digital counter 20 that outputs a count signal in accordance with a clock signal, the TAC circuit 12 may receive inputs of a detection signal and the clock signal and output a measurement signal corresponding to a time between the detection signal and the clock signal, and the control unit 14 functioning as a derivation unit may derive and output time information based on a count signal output from the digital counter 20 and the measurement signal output from the TAC circuit 12. With such a configuration, the digital counter 20, which operates in synchronization with the clock signal, outputs the count signal to perform rough time measurement (a low time resolution and long-time measurement) depending on the frequency of a clock, and the TAC circuit 12 outputs a measurement signal corresponding to a time between the detection signal and the clock signal to perform fine time measurement (a high time resolution and short-time measurement) that compensates for the measurement roughness of the digital counter 20. By combining these time measurement results and deriving final time information, it is possible to achieve a high time resolution and long-time measurement.

A fluorescence lifetime measurement apparatus 1 according to the present embodiment, which is a fluorescence lifetime measurement apparatus that measures the lifetime of fluorescence emitted from a sample S, includes the light source 3 that irradiates the sample S with generated light, the detector 4 that detects fluorescence from the sample S irradiated with light from the light source 3 and outputs the detection signal, the time measurement apparatus 10 that outputs time information related to the detection signal, and the computer 5 that derives the fluorescence lifetime of the sample S based on the time information. With such a fluorescence lifetime measurement apparatus 1, a time waveform of the fluorescence lifetime can be appropriately (continuously) acquired using the time measurement apparatus 10 described above.

The computer 5 may output a setting signal indicating a fluorescence repetition period to the control unit 14 functioning as a setting unit. In this manner, the control unit 14 functioning as a setting unit can appropriately set a gate dead time, which is an integral multiple of the fluorescence repetition period, in the measurement gate 11 by outputting the setting signal indicating the fluorescence repetition period from the computer 5.

Figure 19:
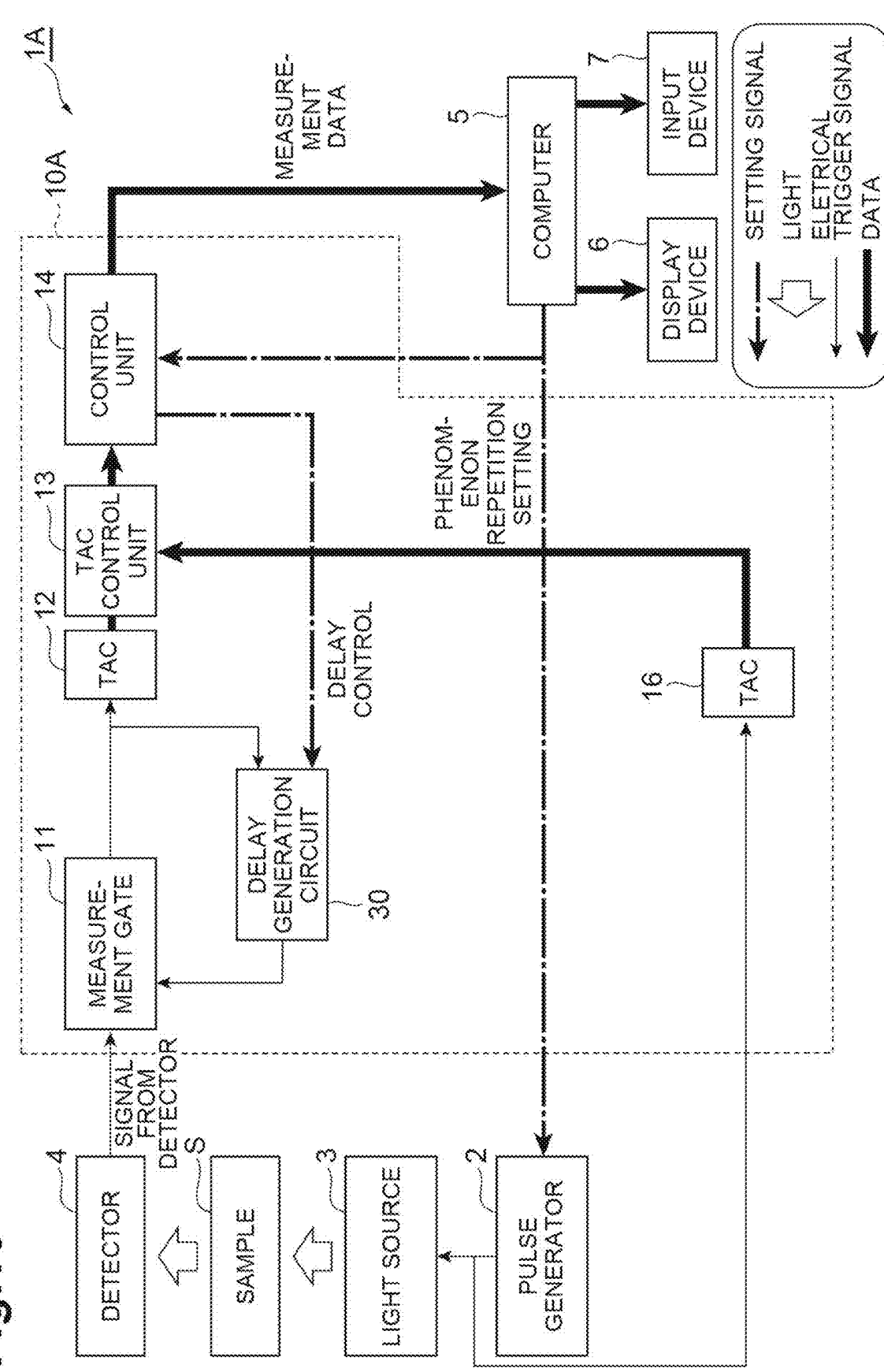
FIG. 19 is a diagram schematically illustrating a fluorescence lifetime measurement apparatus according to a modification example.

Although an embodiment of the present invention has been described above, the present invention is not limited to the above embodiment. For example, as illustrated in FIG. 19, a time measurement apparatus 10A of a fluorescence lifetime measurement apparatus 1A may further include a TAC circuit 16. The TAC circuit 16 is a circuit of a time-amplitude converter that outputs a time difference between the input of a first trigger signal and the input of a second trigger signal as an analog signal (amplitude). The TAC circuit 16 outputs a signal corresponding to a synchronization signal of a phenomenon associated with a detection signal detected by the detector 4. The phenomenon associated with the detection signal detected by the detector 4 is fluorescence from the sample S detected by the detector 4. The synchronization signal of the phenomenon is a signal output by the pulse generator 2, and is a signal synchronized with (for example, the same as) the pulse signal. Specifically, the TAC circuit 16 outputs a synchronization signal as a first trigger signal, outputs a clock signal output from the clock generation circuit 9 as a second trigger signal, outputs an analog signal (amplitude) corresponding to a time difference between the synchronization signal and the clock signal as a signal corresponding to the above-mentioned synchronization signal to the TAC control unit 13. In this case, the control unit 14 functioning as a derivation unit may derive time information further in consideration of the signal corresponding to the above-mentioned synchronization signal output from the TAC circuit 16 (based on the signal). That is, the control unit 14 may specify a start timing (start point) of the phenomenon from the signal corresponding to the synchronization signal, and may derive time information related to the detection signal detected by the detector 4 with higher accuracy. Thereby, it is possible to derive the fluorescence lifetime with higher accuracy in consideration of the actual timing of fluorescence generation.

Figure 20:
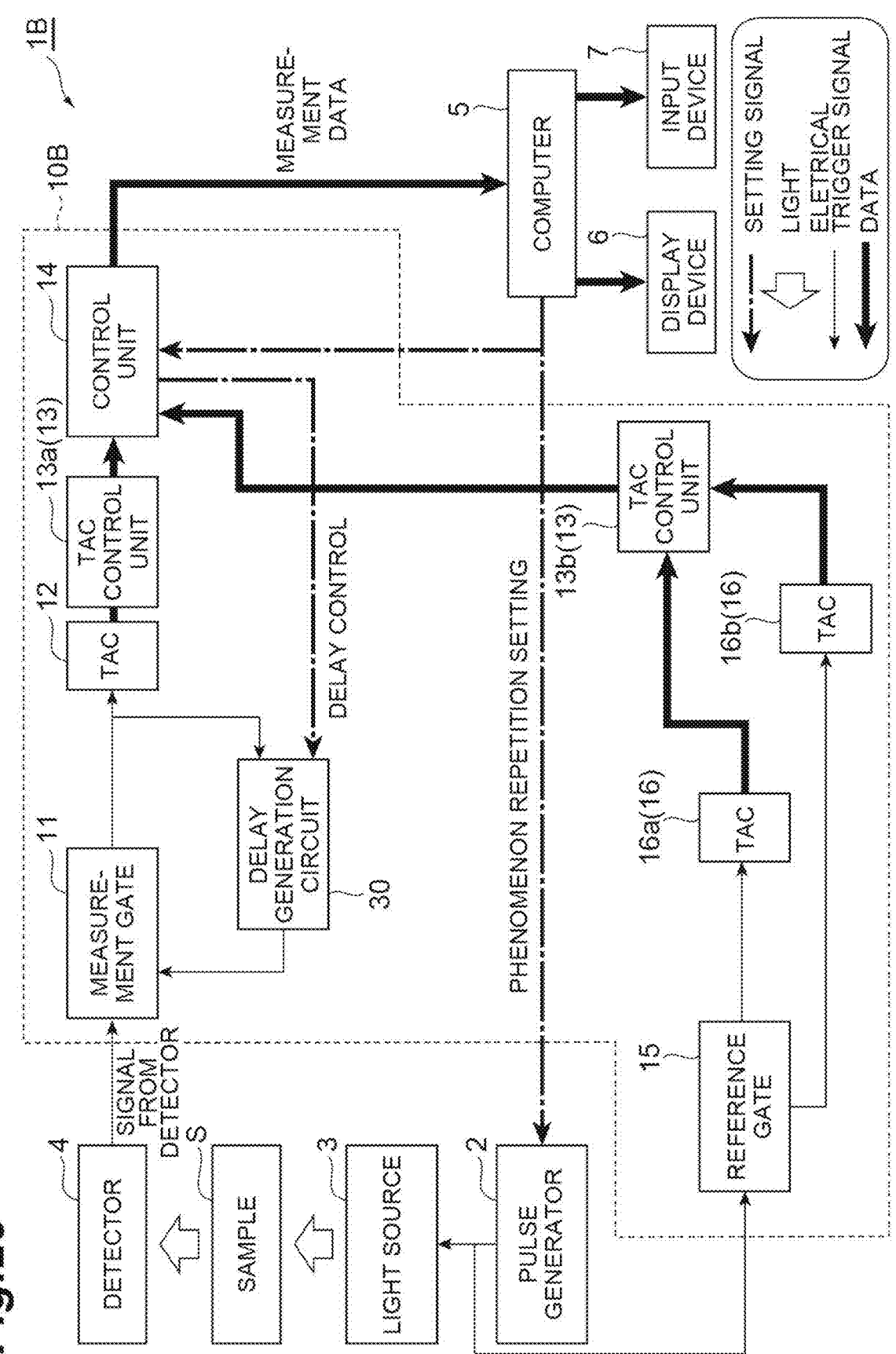
FIG. 20 is a diagram schematically illustrating a fluorescence lifetime measurement apparatus according to a modification example.

In addition, as illustrated in FIG. 20, a time measurement apparatus 10B of a fluorescence lifetime measurement apparatus 1B may include two TAC circuits 16a and 16b as the TAC circuit 16 and may further include a reference gate 15. In addition, the time measurement apparatus 10B may include two TAC control units 13a and 13b as the TAC control unit 13. The TAC circuit 16a outputs a signal corresponding to the above-described synchronization signal to the TAC control unit 13b. In addition, the TAC circuit 16b outputs a signal corresponding to the above-described synchronization signal to the TAC control unit 13b. The TAC control unit 13b converts signals input from the TAC circuits 16a and 16b into digital signals and outputs the digital signals to the control unit 14. Note that, in this case, a signal output from the TAC circuit 12 is output to the TAC control unit 13a, and the TAC control unit 13a converts the signal input from the TAC circuit 12 into a digital signal and outputs it to the control unit 14. The reference gate 15 switches between the TAC circuits 16a and 16b to which the above-mentioned synchronization signal is input, in consideration of dead times of the TAC circuits 16. The reference gate 15 receives the synchronization signal input from the pulse generator 2 and outputs a synchronization signal to only one of the TAC circuits 16a and 16b. The reference gate 15 switches between the TAC circuits 16a and 16b to which a synchronization signal is input, based on switching information which is preset in consideration of dead times. The switching information is specified such that a synchronization signal is not input to the TAC circuits 16a and 16b during a dead time. In this manner, the TAC circuits 16a and 16b into which synchronization signals are input by the reference gate 15 are switched, and thus it is possible to appropriately avoid deterioration in signal measurement efficiency due to the influence of a dead time in the TAC circuit 16.

Figure 21:
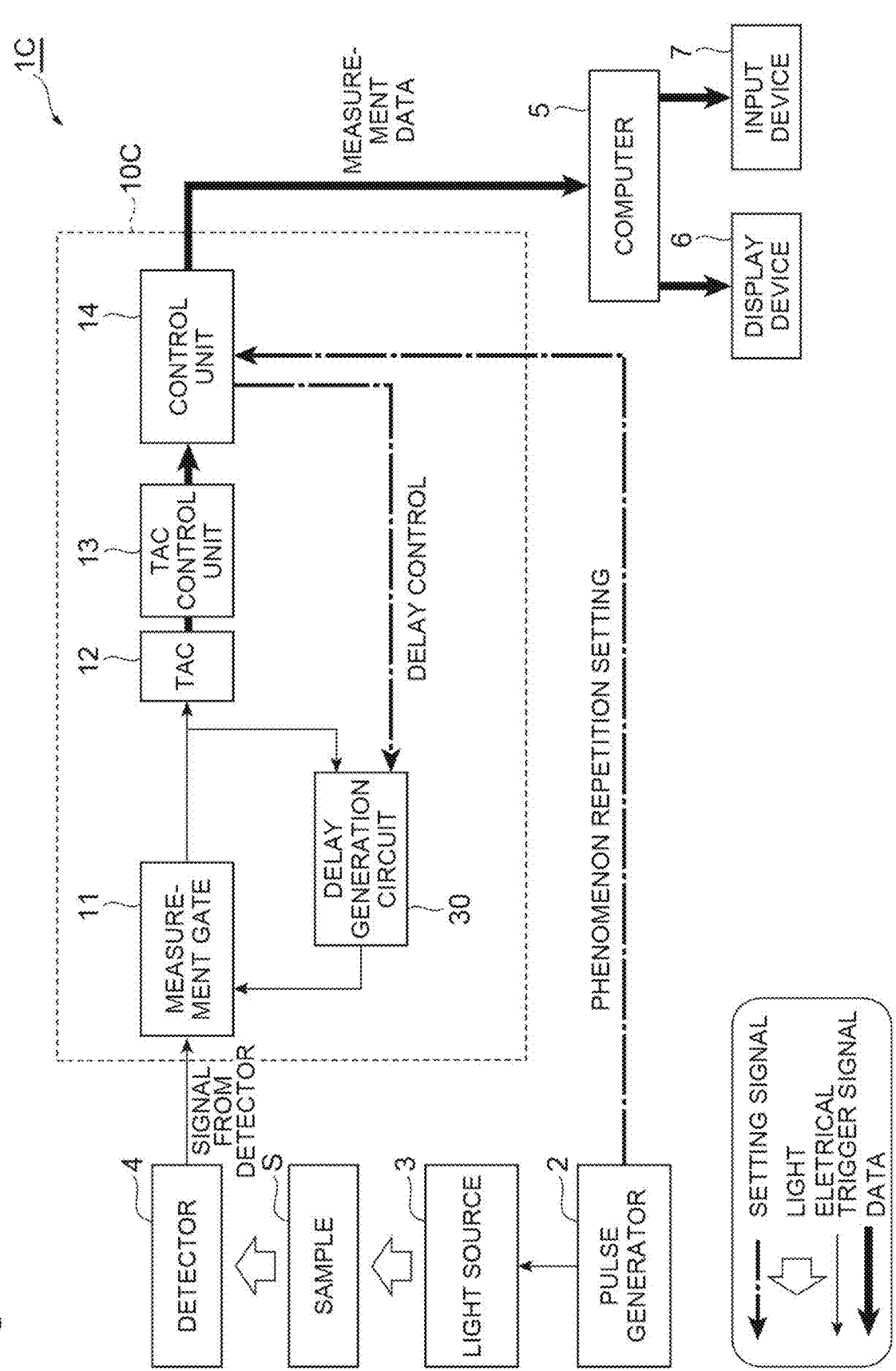
FIG. 21 is a diagram schematically illustrating a fluorescence lifetime measurement apparatus according to a modification example.

In addition, as illustrated in FIG. 21, like a fluorescence lifetime measurement apparatus 1C including a time measurement apparatus 10C, the pulse generator 2 may output a setting signal indicating a fluorescence repetition period synchronized with a pulse signal to the control unit 14 functioning as a setting unit. In this manner, the setting signal indicating the fluorescence repetition period synchronized with the pulse signal is output from the pulse generator

2 that generates the pulse signal, and thus the control unit 14 functioning as a setting unit can appropriately set a gate dead time, which is an integral multiple of the fluorescence repetition period, in the measurement gate 11.

Figure 22:
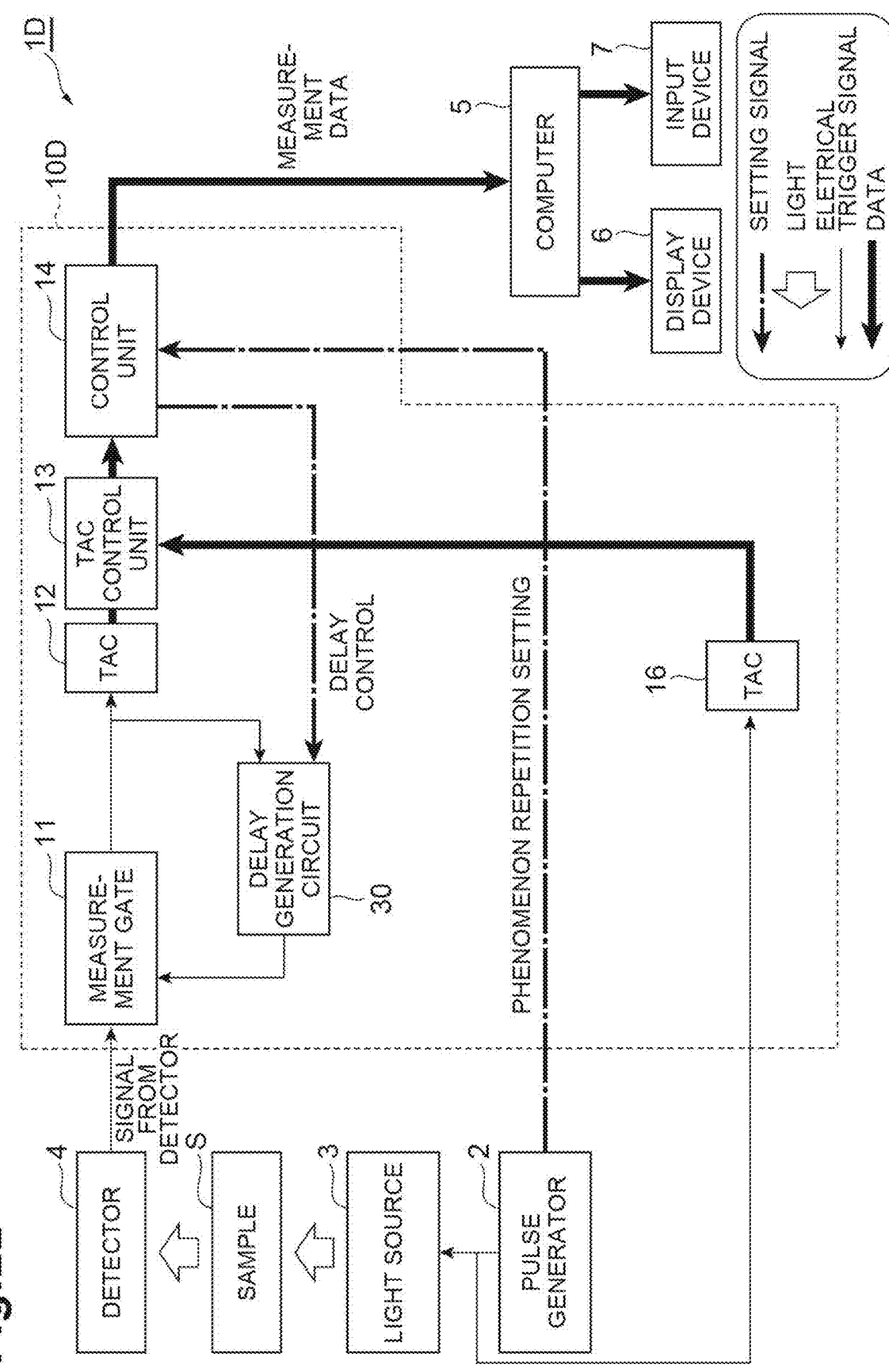
FIG. 22 is a diagram schematically illustrating a fluorescence lifetime measurement apparatus according to a modification example.

Further, as illustrated in FIG. 22, a time measurement apparatus 10D of a fluorescence lifetime measurement apparatus 1D may include a TAC circuit 16 in addition to the configuration of the time measurement apparatus 10C described above. With such a configuration, even in a configuration in which a setting signal is output from the pulse generator 2, it is possible to derive the fluorescence lifetime with higher accuracy in consideration of the actual timing of fluorescence generation.

REFERENCE SIGNS LIST

1, 1A, 1B, 1C, 1D Fluorescence lifetime measurement apparatus
2 Pulse generator (signal generation unit)
3 Light source
4 Detector
5 Computer (arithmetic operation unit)
10, 10A, 10B, 10C, 10D Time measurement apparatus
11 Measurement gate (gate unit)
12 TAC circuit (time-amplitude converter)
13 TAC control unit (converter)
14 Control unit (setting unit, derivation unit)
15 Reference gate
16 TAC circuit (second time measurement instrument)
20 digital counter
30 delay generation circuit

The invention claimed is:

1. A fluorescence lifetime measurement apparatus that measures a lifetime of fluorescence emitted from a measurement target, the fluorescence lifetime measurement apparatus comprising:
   a light source configured to generate light;
   a detector configured to detect fluorescence with a repetition period from a measurement target irradiated with the light and output a detection signal;
   a time-amplitude converter configured to receive an input of the detection signal and output a measurement signal corresponding to a time associated with the detection signal;
   a gate configured to be provided between the detector and the time-amplitude converter and set to be in a first state where the detection signal is transmitted in a direction of the time-amplitude converter, or a second state where the detection signal is not transmitted in a direction of the time-amplitude converter;
   a controller configured to receive the measurement signal corresponding to the time associated with the detection signal when the gate is set to be in the first state, wherein the controller sets a gate dead time during which the gate is set to be in the second state in the gate, and derive and output time information related to the detection signal based on the measurement signal output from the time-amplitude converter, and the controller sets a time, which is an integral multiple of the repetition period of the fluorescence detected by the detector and is longer than a dead time of the time-amplitude converter itself, in the gate as the gate dead time; and
   a computer configured to derive a fluorescence lifetime of the measurement target based on the time information.

2. The fluorescence lifetime measurement apparatus according to claim 1, further comprising:

a delay generation circuit, wherein the controller sets a delay amount that is the integral multiple of the repetition period in the delay generation circuit, the delay generation circuit receives an input of the detection signal that has passed through the gate set to be in the first state, and outputs a delay signal delayed by the delay amount set by the controller with respect to the detection signal to the gate, and the gate is set to be in the first state to transmit the detection signal, is set to be in the second state until receiving an input of the delay signal, and receives the input of the delay signal, and then is set to be in the first state until a new detection signal is input.

3. The fluorescence lifetime measurement apparatus according to claim 1, wherein the time-amplitude converter outputs the measurement signal corresponding to a time associated with the detection signal as an analog signal, and the fluorescence lifetime measurement apparatus further includes:

a converter that converts the analog signal output from the time-amplitude converter into a digital signal and outputs the digital signal.

4. The fluorescence lifetime measurement apparatus according to claim 1, further comprising:

a counter configured to output a count signal in accordance with a clock signal, wherein the time-amplitude converter receives inputs of the detection signal and the clock signal and outputs the measurement signal corresponding to a time between the detection signal and the clock signal, and the controller derives and outputs the time information based on the count signal output from the counter and the measurement signal output from the time-amplitude converter.

5. The fluorescence lifetime measurement apparatus according to claim 1, further comprising:

a signal generator configured to generate a pulse signal for controlling output of light from the light source, wherein the signal generator outputs a setting signal indicating the repetition period of the fluorescence, which is synchronized with the pulse signal, to the controller.

6. The fluorescence lifetime measurement apparatus according to claim 1, wherein the computer outputs a setting signal indicating the repetition period of the fluorescence to the controller.

7. The fluorescence lifetime measurement apparatus according to claim 1, further comprising:

a signal generator configured to generate a pulse signal for controlling output of light from the light source, wherein the generator outputs a synchronization signal synchronized with the pulse signal, the fluorescence lifetime measurement apparatus further includes a time measurement instrument that outputs a signal corresponding to the synchronization signal, and the controller derives the time information based on the signal corresponding to the synchronization signal.

8. A time measurement method executed by a time measurement apparatus, the time measurement method comprising:

detecting, at a detector, fluorescence with a repetition period from a measurement target irradiated with light and outputting a detection signal;

receiving, at a time-amplitude converter, an input of the detection signal and outputting a measurement signal corresponding to a time associated with the detection signal;

receiving the measurement signal corresponding to the time associated with the detection signal when a gate is set to be in a first state, wherein a gate is configured to be provided between the detector and the time-amplitude converter and set to be in the first state where the detection signal is transmitted in a direction of the time-amplitude converter, or a second state where the detection signal is not transmitted in a direction of the time-amplitude converter;

setting a gate dead time during which the gate is set to be in the second state; and deriving and outputting time information related to the detection signal based on the detection signal output from the time-amplitude converter, wherein the first dead time is longer than a second dead time of the time-amplitude converter itself.

* * * * *